(12) United States Patent
Saito et al.

(10) Patent No.: US 9,321,429 B2
(45) Date of Patent: Apr. 26, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Takuhiro Saito, Aichi (JP); Tomonari Umakoshi, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 301 days.

(21) Appl. No.: 13/921,790

(22) Filed: Jun. 19, 2013

(65) Prior Publication Data

US 2013/0341451 A1 Dec. 26, 2013

(30) Foreign Application Priority Data

Jun. 21, 2012 (JP) .................................. 2012-139812
Jun. 21, 2012 (JP) .................................. 2012-139813

(51) Int. Cl.
*B60R 22/38* (2006.01)
*B60R 22/46* (2006.01)
*B60R 22/44* (2006.01)

(52) U.S. Cl.
CPC .............. *B60R 22/4619* (2013.01); *B60R 22/46* (2013.01); *B60R 2022/4466* (2013.01); *B60R 2022/468* (2013.01); *B60R 2022/4666* (2013.01)

(58) Field of Classification Search
CPC ......................... B60R 22/46; B60R 2022/4466
USPC .............................................. 242/374, 381.5
See application file for complete search history.

(56) References Cited

U.S. PATENT DOCUMENTS 7,506,832 B2 * 3/2009 Mori ............................. 242/374
7,775,473 B2 * 8/2010 Mori ............................. 242/374
8,708,269 B2 * 4/2014 Saito ............................. 242/374

(Continued)

FOREIGN PATENT DOCUMENTS

EP           1731389        12/2006
JP      2005-324772 A      11/2005

(Continued)

OTHER PUBLICATIONS

European Search Report Application No. 13172951.9-1503 mailed Sep. 12, 2013.
Japanese Office Action dated Sep. 29, 2015.

*Primary Examiner* — Sang Kim
(74) *Attorney, Agent, or Firm* — Roberts Mlotkowski Safran & Cole, PC

(57) ABSTRACT

A webbing take-up device includes a spool and a spiral spring that biases the spool in a take-up direction and a motor provided with an output shaft. The webbing take-up device further includes a first clutch that transmits forward direction rotation of the output shaft to the spool, rotating the spool in the take-up direction. The webbing take-up device further includes a second clutch including: weights that are rotated by the output shaft and that open out under their own centrifugal force; a connection-disconnection mechanism that receives force from the weights opening out and connects so as to enable rotation of the output shaft to be transmitted to the spool; and projection portions serving as load limiting portions that limit the load imparted to the connection-disconnection mechanism so as not to become a specific value or greater.

12 Claims, 22 Drawing Sheets

(56) References Cited

U.S. PATENT DOCUMENTS

2005/0224621 A1 10/2005 Mori
2007/0051841 A1 3/2007 Mori
2012/0119009 A1 5/2012 Saito

FOREIGN PATENT DOCUMENTS

| | | |
|---|---|---|
| JP | 2006-199116 | 8/2006 |
| WO | 2011040615 | 4/2011 |

* cited by examiner

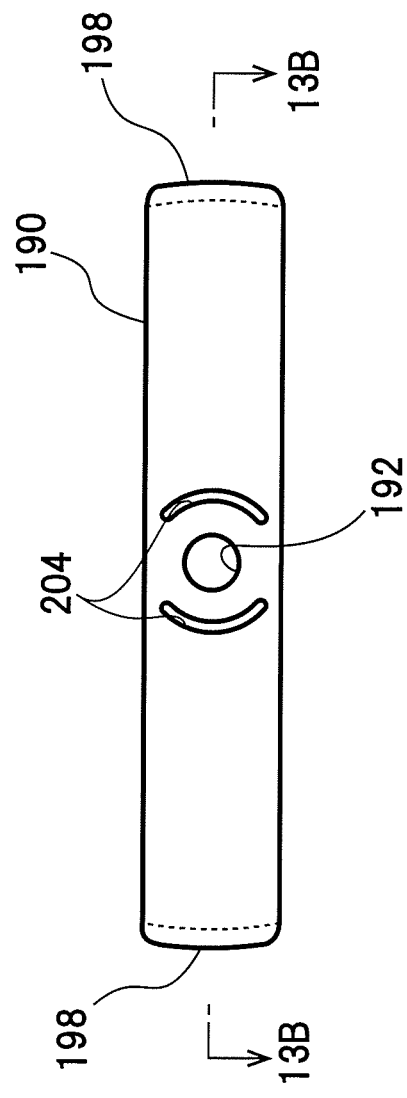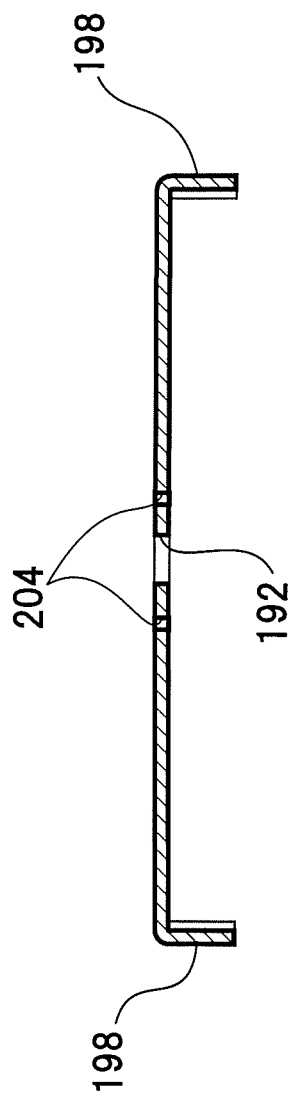
FIG.22A
FIG.22B

WEBBING TAKE-UP DEVICE

CROSS-REFERENCE TO RELATED APPLICATION

This application claims priority under 35 USC 119 from Japanese Patent Applications No. 2012-139812 filed Jun. 21, 2012 and No. 2012-139813 filed Jun. 21, 2012, the disclosures of which are incorporated by reference herein.

BACKGROUND OF THE INVENTION

1. Field of the Invention

The present invention relates to a webbing take-up device that configures a vehicle seat belt device.

2. Related Art

Webbing take-up devices are known that are provided with a clutch wherein clutch weights deploy due to centrifugal force, allowing rotation of a motor to be transmitted to a spool (see Japanese Patent Application Laid-Open (JP-A) No. 2005-324772). Further, clutches are configured such that reverse direction rotation of the motor is transmitted to the spool, and configured such that forward direction rotation of the motor is not transmitted to the spool.

However, the centrifugal force imparted to the clutch weights depends on the revolution speed of the clutch weights themselves. As a result, the load imparted to a connection-disconnection mechanism that receives the force of the clutch weights deploying and transmits rotation of the motor to the spool also depends on the revolution speed of the clutch weights themselves.

Moreover, when the motor rotates the clutch weights deploy due to their own centrifugal force regardless of the rotation direction thereof. Namely, the clutch weights deploy due to their own centrifugal force even when there is no need for the clutch weights to deploy (even when the motor rotates in a forward direction).

Target values for the durability of a clutch configured including clutch weights are set giving consideration to the number of times that the clutch weights deploy.

SUMMARY OF THE INVENTION

In consideration of the above circumstances, the present invention is to obtain a webbing take-up device capable of stabilizing the load imparted to a connection-disconnection mechanism provided between a motor and a spool.

In consideration of the above circumstances, the present invention is to obtain a webbing take-up device capable of increasing the durability of a clutch provided between a motor and a spool.

A webbing take-up device of a first aspect of the present invention includes: a spool to which a base end side in a length direction of a webbing is anchored, the spool taking up and storing the webbing by rotating in a take-up direction; a spring that biases the spool towards the take-up direction; a motor that rotates an output shaft about an axis thereof by being supplied with power; and a clutch that is provided between the spool and the output shaft, the clutch comprising: a clutch weight that is rotated by the output shaft and that deploys as a result of its own centrifugal force; a connection-disconnection mechanism that receives force from the clutch weight deploying and connects so as to enable rotation of the output shaft to be transmitted to the spool; and a load limiting portion that limits the force of the clutch weight deploying that is imparted to the connection-disconnection mechanism so as not to reach a specified value or greater, the clutch transmitting a reverse direction rotation of the output shaft to the spool and rotating the spool in the take-up direction.

In the first aspect of the present invention, when the output shaft of the motor rotates, the rotation of the output shaft is transmitted through the clutch. The spool rotates in the take-up direction as a result.

The clutch weight configuring the clutch is rotated by the output shaft of the motor and deploys (opens out) under its own centrifugal force. The centrifugal force imparted to the clutch weight depends on the revolution speed of the clutch weight itself, and the load imparted to the connection-disconnection mechanism that receives force from the clutch weight opening out and transmits the rotation of the motor to the spool also depends on the revolution speed of the clutch weight itself. However, in the aspect of the present invention the force imparted to the connection-disconnection mechanism is limited so as not to become the specific value or greater due to the provision of the load limiting portion.

A webbing take-up device of a second aspect of the present invention includes: a spool to which a base end side in a length direction of a webbing is anchored, the spool taking up and storing the webbing by rotating in a take-up direction; a spring that biases the spool towards the take-up direction; a motor that rotates an output shaft about an axis thereof by being supplied with power; a first clutch that is provided between the spool and the output shaft, that transmits, to the spool, forward direction rotation of the output shaft, which rotation is reduced in speed by a specified speed reduction ratio, that rotates the spool in the take-up direction, and that does not transmit rotation arising on the spool side to the output shaft; and a second clutch that is provided between the spool and the output shaft independently of the first clutch, the second clutch comprising: a clutch weight that is rotated by the output shaft and deploys as a result of its own centrifugal force; a connection-disconnection mechanism that receives force from the clutch weight deploying and connects so as to enable transmission of rotation of the output shaft to the spool; and a load limiting portion that limits the force of the clutch weight deploying that is imparted to the connection-disconnection mechanism so as not to reach a specified value or greater, the second clutch transmitting, to the spool, reverse direction rotation of the output shaft, which rotation is reduced in speed by a speed reduction ratio lower than the specified speed reduction ratio, and rotating the spool in the take-up direction, and the second clutch not transmitting rotation arising on the spool side to the output shaft.

The second aspect of the present invention includes the first clutch and the second clutch configured as described above. Rotation of the motor can accordingly be transmitted to the spool by two routes, these being the torque transmission route through the first clutch and the torque transmission route through the second clutch.

Namely, when the output shaft of the motor rotates in the forward direction, the rotation of the output shaft is transmitted to the spool with being reduced in speed by the specific speed reduction ratio (by the route through the first clutch). The spool rotates in the take-up direction as a result. When the output shaft of the motor rotates in the reverse direction, the rotation of the output shaft is transmitted to the spool with being reduced in speed by the speed reduction ratio that is lower than the specific speed reduction ratio (by the route through the second clutch). As a result, the spool accordingly rotates in the take-up direction with a smaller torque than when the output shaft of the motor rotates in the forward direction.

Moreover, the clutch weight configuring the second clutch is rotated by the output shaft of the motor, and opens out under its own centrifugal force. The centrifugal force imparted to the clutch weight depends on the revolution speed of the clutch weight itself, and the load imparted to the connection-disconnection mechanism that receives force from the clutch weight opening out and transmits the rotation of the motor to the spool also depends on the revolution speed of the clutch weight itself. However, in the aspect of the present invention, the force imparted to the connection-disconnection mechanism from the clutch weight is limited so as not to become the specific value or greater due to the provision of the load limiting portion.

In the first aspect and the second aspect, it is possible that the load limiting portion is an abutted portion to which the deployed clutch weight is abutted.

A webbing take-up device of a third aspect of the present invention is the webbing take-up device of the second aspect wherein: the connection-disconnection mechanism includes: a base; a rotor that is connected to the output shaft of the motor and that rotates as a result of rotation of the output shaft being transmitted; a clutch gear that is provided so as to be capable of relative rotation with respect to the rotor, that is connected to the spool, and that rotates the spool by rotating; a clutch spring that is provided coaxially to, and capable of relative rotation with respect to, the clutch gear, and that has one winding direction end portion coupled to the rotor and another winding direction end portion, the clutch spring engaging with the clutch gear by an external diameter dimension of the clutch spring being increased by the other winding direction end portion moving towards a one winding direction, and rotating the clutch gear integrally with the rotor; and a lever that is provided so as to be capable of rotating about an axis thereof with respect to the base, that is biased in one direction about a base axis, and that is coupled to the other winding direction end portion of the clutch spring, the lever moving the other winding direction end portion of the clutch spring towards the one winding direction by rotating in another direction about the base axis, and wherein the clutch weight is supported on the base, which is axially-supported so as to be rotatable about the axis, the clutch weight is coupled to the lever, and the clutch weight is deployed towards the base radial direction outer side to rotate the lever in the other direction about the base axis.

In the third aspect of the present invention, when the output shaft of the motor rotates in the reverse direction, the rotor connected to the output shaft rotates together with the base. The clutch weight that is supported on the base opens out under its own centrifugal force due to the rotation of the base. As a result, the lever that is coupled to the clutch weight is actuated, increasing the external diameter dimension of the clutch spring towards the radial direction outside. When the external diameter dimension of the clutch spring is increased, the clutch spring engages with the clutch gear, and the clutch gear rotates integrally with the rotor. The reverse direction rotation of the output shaft of the motor is accordingly transmitted to the spool.

Note that in the aspect of the present invention, the load input to the clutch spring through the lever from the clutch weight is stabilized due to the provision of the load limiting portion. As a result, the contact (engagement) load between the clutch spring and the clutch gear is stabilized.

A webbing take-up device of a fourth aspect of the present invention is the webbing take-up device of the third aspect wherein the load limiting portion is a projection portion which is provided at the base and to which the clutch weight abuts as a result of the clutch weight deploying.

In the fourth aspect of the present invention, the load input from the clutch weight to the clutch spring through the lever is limited due to the opened out clutch weight abutting the projection portion provided at the base.

A webbing take-up device of a fifth aspect of the present invention is the webbing take-up device of the third aspect wherein the load limiting portion is a guide groove which is provided at the base and which limits a range of rotation of the lever to a specified range.

In the fifth aspect of the present invention, the load input from the clutch weight to the clutch spring through the lever is limited due to the range of rotating of the lever being restricted to the specific range by the guide groove.

A webbing take-up device of a sixth aspect of the present invention includes: a spool to which a base end side in a length direction of a webbing is anchored, the spool taking up and storing the webbing by rotating in a take-up direction; a spring that biases the spool towards the take-up direction; a motor that rotates an output shaft about an axis thereof by being supplied with power; a first clutch that is provided between the spool and the output shaft, that transmits, to the spool, forward direction rotation of the output shaft, which rotation is reduced in speed by a specified speed reduction ratio, that rotates the spool in the take-up direction, and that does not transmit rotation arising on the spool side to the output shaft; and a second clutch that is provided between the spool and the output shaft independently of the first clutch, the second clutch comprising a clutch weight that is restricted from deploying at a time of forward direction rotation of the output shaft and that is permitted to deploy at a time of reverse direction rotation of the output shaft, and as a result of deployment of the clutch weight, the second clutch transmitting, to the spool, reverse direction rotation of the output shaft, which rotation is reduced in speed by a speed reduction ratio lower than the specified speed reduction ratio, and rotating the spool in the take-up direction, and the second clutch not transmitting rotation arising on the spool side to the output shaft.

The sixth aspect of the present invention includes the first clutch and the second clutch configured as described above. The rotation of the motor can accordingly be transmitted to the spool through the two routes of the torque transmission route through the first clutch and the torque transmission route through the second clutch.

Namely, when the output shaft of the motor rotates in the forward direction, the rotation of the output shaft is transmitted to the spool with being reduced in speed by the specific speed reduction ratio (by the route through the first clutch). The spool rotates in the take-up direction as a result. When the output shaft of the motor rotates in the reverse direction, the rotation of the output shaft is transmitted to the spool with being reduced in speed by the speed reduction ratio that is lower than the specific speed reduction ratio (by the route through the second clutch). The spool accordingly rotates in the take-up direction with a smaller torque than when the output shaft of the motor rotates in the forward direction.

Note that the second clutch is configured such that when the output shaft of the motor rotates in the reverse direction, the rotation of the output shaft of the motor is transmitted to the spool. In the aspect of the present invention, although the clutch weight of the second clutch attempts to open out under its own centrifugal force when the output shaft of the motor rotates in the forward direction, however, the opening out operation of the clutch weight is restricted when the output shaft of the motor rotates in the forward direction. In other words, configuration is made such that during transmission of the rotation of the output shaft of the motor through the first clutch to the spool, the clutch weight configuring the second clutch does not open out (does not actuate). The number of times that the clutch weight configuring the second clutch opens out (is actuated) is accordingly reduced.

A webbing take-up device of a seventh aspect of the present invention is the webbing take-up device of the sixth aspect wherein the second clutch includes a stopper that abuts the clutch weight to restrict the clutch weight from deploying at the time of forward direction rotation of the output shaft.

In the seventh aspect of the present invention, when the output shaft of the motor rotates in the forward direction, the stopper abuts the clutch weight to restrict the clutch weight from opening out. In other words, configuration is made such that during transmission of the rotation of the output shaft of the motor through the first clutch to the spool, the clutch weight configuring the second clutch does not open out (does not actuate). The number of times that the clutch weight configuring the second clutch opens out (is actuated) is accordingly reduced as a result.

In the seventh aspect, it is possible that the second clutch comprises a base that is supported so as to be rotatable about an axis thereof, the clutch weight being supported on the base, a projection portion is provided at the base, when the base rotates due to forward direction rotation of the output shaft, the projection portion abuts a portion of the stopper and retains the stopper at a position that restricts deployment of the clutch weight, and when the base rotates due to reverse direction rotation of the output shaft, the projection portion abuts another portion of the stopper and retains the stopper at a position that permits deployment of the clutch weight.

Further, it is possible that the portion and the other portion of the stopper are one end portion in an axis rotation direction and another end portion in the axis rotation direction of the stopper.

A webbing take-up device of an eighth aspect of the present invention is the webbing take-up device of the seventh aspect wherein the second clutch includes: a base that is supported so as to be rotatable about an axis thereof, a rotor that is integrally coupled to the base, that is connected to the output shaft of the motor and that rotates as a result of rotation of the output shaft being transmitted, a clutch gear that is provided so as to be capable of relative rotation with respect to the rotor, that is connected to the spool, and that rotates the spool by rotating, a clutch spring that is provided coaxially to, and capable of relative rotation with respect to, the clutch gear, and that has one winding direction end portion coupled to the rotor and another winding direction end portion, the clutch spring engaging with the clutch gear by an external diameter dimension of the clutch spring being increased by the other winding direction end portion moving towards a one winding direction, and rotating the clutch gear integrally with the rotor, and a lever that is provided so as to be capable of rotating about an axis thereof with respect to the base, that is biased in one direction about a base axis, and that is coupled to the other winding direction end portion of the clutch spring, the lever moving the other winding direction end portion of the clutch spring towards the one winding direction by rotating in another direction about the base axis; the clutch weight that is supported so as to be capable of deploying in a radial direction with respect to the base, that is coupled to the lever, and that is retained by the lever at the radial direction inner side of the base, the clutch weight deploying towards the radial direction outer side of the base due to centrifugal force acting on the clutch weight during rotation of the base caused by the rotation of the output shaft, thereby rotating the lever in the other direction about the base axis, and the stopper, which is disposed coaxially to the base and is supported so as to be rotatable with the base axis as a rotation axis.

In the eighth aspect of the present invention, when the output shaft of the motor rotates in the reverse direction, the rotor that is connected to the output shaft rotates together with the base. The clutch weight that is supported on the base opens out under its own centrifugal force due to the rotation of the base. As a result, the lever is actuated, increasing the external diameter dimension of the clutch spring towards the radial direction outside. When the external diameter dimension of the clutch spring is increased, the clutch gear and the rotor rotate integrally. The reverse direction rotation of the output shaft of the motor is accordingly transmitted to the spool.

Moreover, when the output shaft of the motor rotates in the forward direction, the stopper abuts the clutch weight, restricting the clutch weight from opening out. In other words, the clutch gear and the clutch spring do not engage with each other when the output shaft of the motor rotates in the forward direction. The number of times that the clutch gear and the clutch spring, configuring the second clutch, engage with each other is reduced as a result.

A webbing take-up device of a ninth aspect of the present invention is the webbing take-up device of the eighth aspect wherein a projection portion projecting towards the radial direction outer side of the base is provided at the base, when the base rotates due to forward direction rotation of the output shaft, the projection portion abuts a portion of the stopper and retains the stopper at a position that restricts deployment of the clutch weight, and when the base rotates due to reverse direction rotation of the output shaft, the projection portion abuts another portion of the stopper and retains the stopper at a position that permits deployment of the clutch weight.

In the ninth aspect of the present invention, when the base rotates due to the forward direction rotation of the output shaft of the motor, the projection portion provided at the base abuts the portion of the stopper. As a result, the stopper is retained at the position that restricts opening out of the clutch weight. Moreover, when the base rotates due to the reverse direction rotation of the output shaft of the motor, the projection portion provided at the base abuts the other portion of the stopper. As a result, the stopper is retained at the position that permits opening out of the clutch weight.

A webbing take-up device of a tenth aspect of the present invention is the webbing take-up device of the ninth aspect wherein rotation of the stopper is restricted until the projection portion abuts the one portion of the stopper or the other portion of the stopper as a result of rotation of the base.

In the tenth aspect of the present invention, rotation of the stopper is restricted until the projection portion abuts the portion of the stopper or the other portion of the stopper due to rotation of the base. The time until the projection portion provided at the base abuts the stopper is accordingly stabilized.

A webbing take-up device of an eleventh aspect of the present invention is the webbing take-up device of the ninth aspect wherein rotation of the stopper is restricted until the projection portion abuts the one portion of the stopper or the other portion of the stopper as a result of one part of the stopper being abutted or being press fit into a component member of the webbing take-up device.

In the eleventh aspect of the present invention, rotation of the stopper is restricted until the projection portion abuts the one portion of the stopper or the other portion of the stopper as a result of one part of the stopper being abutted or being press fit into a component member of the webbing take-up device. The time until the projection portion provided at the base abuts the stopper is accordingly stabilized.

The webbing take-up device according to the first aspect and the second aspect of the present invention exhibits the excellent advantageous effect of enabling the load imparted to the connection-disconnection mechanism that is provided between the motor and the spool to be stabilized.

The webbing take-up device according to the third aspect to the fifth aspect of the present invention exhibits the excellent advantageous effect of enabling the clutch spring and the clutch gear to be made to engage with each other with a stable contact load.

The webbing take-up device according to the sixth aspect to the eighth aspect of the present invention exhibits the excellent advantageous effect of enabling the durability of the second clutch that is provided between the motor and the spool to be increased.

The webbing take-up device according to the ninth aspect of the present invention exhibits the excellent advantageous effect of enabling the stopper to be retained in a stable state at the position that restricts opening out of the clutch weight and at the position that permits opening out of the clutch weight.

The webbing take-up device according to the tenth aspect and the eleventh aspect of the present invention exhibits the excellent advantageous effect of enabling a timing at which the projection portion provided at the base abuts the stopper to be stabilized.

BRIEF DESCRIPTION OF THE DRAWINGS

Embodiments of the invention will be described in detail with reference to the following figures, wherein:

FIGS. 9A and 9B illustrate a partial configuration of a second clutch that is a configuration member of a webbing take-up device according to the first exemplary embodiment wherein FIG. 9A is a side view illustrating a normal state of a clutch spring, and FIG. 9B is a side view illustrating an enlarged state of the external diameter dimension of the clutch spring;

FIGS. 10A and 10B illustrate a partial configuration of a second clutch that is a configuration member of a webbing take-up device according to the first exemplary embodiment, wherein FIG. 10A is a plan view cross-section illustrating a normal state of a clutch spring, and FIG. 10B is a plan view cross-section illustrating an enlarged state of the external diameter dimension of the clutch spring;

FIGS. 11A and 11B illustrate a partial configuration of a second clutch that is a configuration member of a webbing take-up device according to the first exemplary embodiment, wherein FIG. 11A is a side view illustrating a pair of weights in a retained state to a base radial direction inside, and FIG. 11B is a side view illustrating the pair of weights in an opened out state towards the base radial direction outside;

FIGS. 18A and 18B illustrate a partial configuration of a second clutch that is a configuration member of a webbing take-up device according to the second exemplary embodiment, wherein FIG. 18A is a side view illustrating a normal state of a clutch spring, and FIG. 18B is a side view illustrating an enlarged state of the external diameter dimension of the clutch spring;

FIGS. 19A and 19B illustrate a partial configuration of a second clutch that is a configuration member of a webbing take-up device according to the second exemplary embodiment, wherein FIG. 19A is a plan view cross-section illustrating a normal state of a clutch spring, and FIG. 19B is a plan view cross-section illustrating an enlarged state of the external diameter dimension of the clutch spring;

FIGS. 20A and 20B illustrate a partial configuration of a second clutch that is a configuration member of a webbing take-up device according to the second exemplary embodiment, wherein FIG. 20A is a side view illustrating a pair of weights in an opened out state towards a base radial direction outside, and FIG. 20B is a side view illustrating the pair of weights in a retained state to the base radial direction inside;

FIG. 22A is a plan view illustrating a stopper according to a modified example, and FIG. 22B is a cross-section of the stopper taken along line 13B-13B in FIG. 22A.

DETAILED DESCRIPTION OF THE INVENTION

Explanation follows regarding a webbing take-up device according to a first exemplary embodiment of the present invention, with reference to FIG. 1 to FIG. 11.

Figure 1:
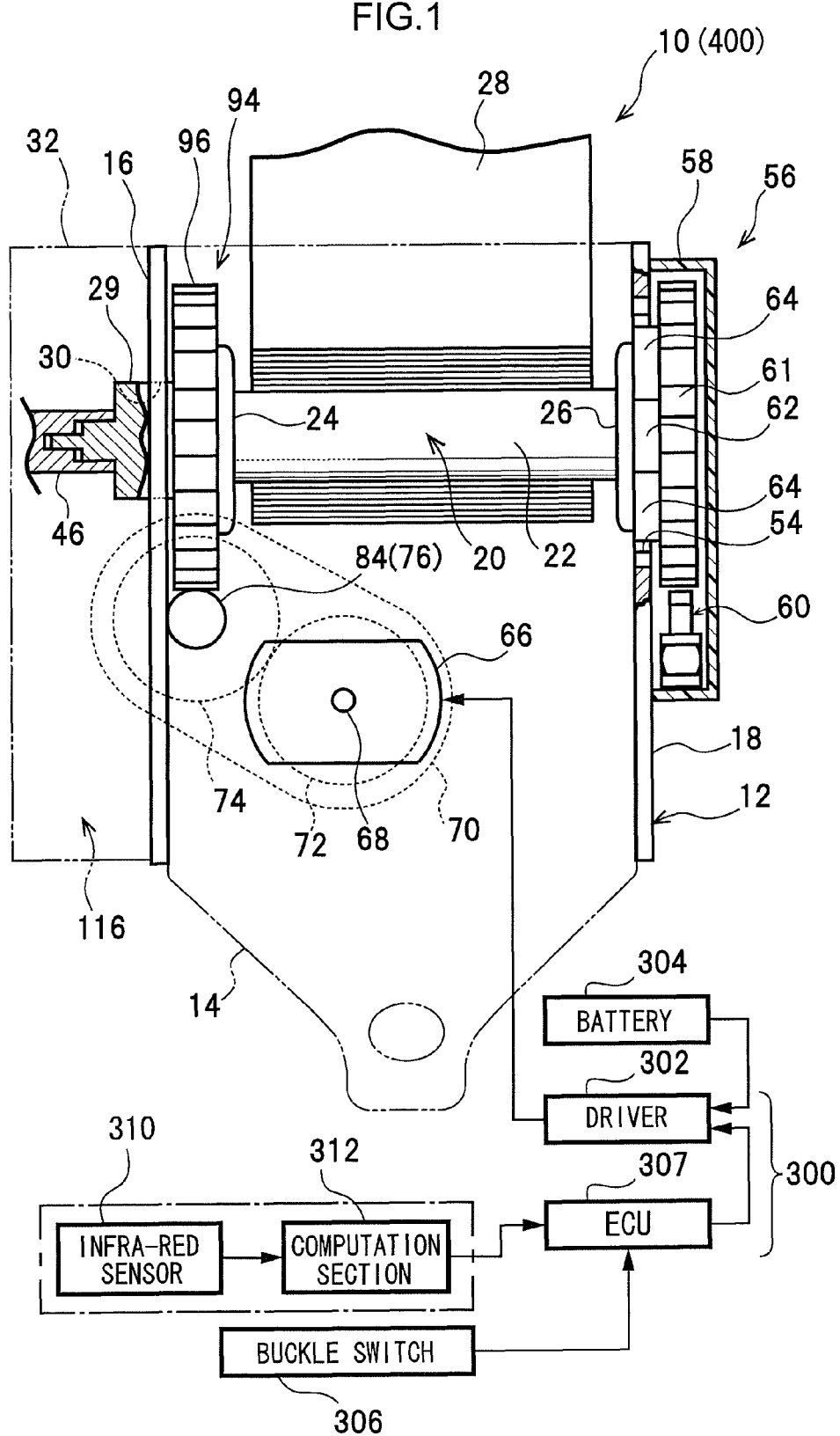
FIG. 1 is a schematic back-face cross-section illustrating an overall configuration of a webbing take-up device according to a first exemplary embodiment and a second exemplary embodiment.

FIG. 1 is a back-face cross-section illustrating a schematic overall configuration of a webbing take-up device 10 according to the first exemplary embodiment of the present invention.

As illustrated in FIG. 1, the webbing take-up device 10 is provided with a frame 12. The frame 12 includes a substantially plate shaped back plate 14. The back plate 14 is fixed to the vehicle body by fasteners such as bolts, not shown in the drawings, such that the webbing take-up device 10 is configured fixed to the vehicle body. A pair of leg plates 16 and 18 extend parallel to each other from the two width direction edges of the back plate 14. A spool 20, manufactured for example by die casting, is rotatably disposed between the leg plates 16 and 18.

The spool 20 is provided with a substantially circular cylinder shaped spool main body 22, and a pair of flange portions 24 and 26 respectively formed in substantially circular plate shapes at both end portions of the spool main body 22, giving a drum-like shape overall.

A base end portion of a webbing 28 formed in an elongated strap shape is fixed to the spool main body 22 between the flange portions 24 and 26. The webbing 28 is taken up onto an outer peripheral portion of the spool main body 22 from the base end side in a layered state when the spool 20 is rotated about its axis in one direction (this direction is referred to below as the "take-up direction"). When the webbing 28 is pulled from its leading end side, the webbing 28 that has been taken up on the outer peripheral portion of the spool main body 22 is pulled out, accompanying which the spool 20 rotates in the opposite direction to the rotation direction during take up of the webbing 28 (the rotation direction of the spool 20 when pulling out the webbing 28 is referred to below as the "pull-out direction").

The spool 20 is further provided with a support shaft portion 29 that projects out coaxially to the spool 20 from a flange portion 24 side end portion. The support shaft portion 29 passes substantially coaxially through a circular hole 30 formed in the leg plate 16 and projects to the outside of the frame 12. A case 32 is disposed to the outside of the frame 12 on the leg plate 16 side. The case 32 is disposed facing the leg plate 16 along the spool 20 axial direction, and is fixed to the leg plate 16.

Figure 2:
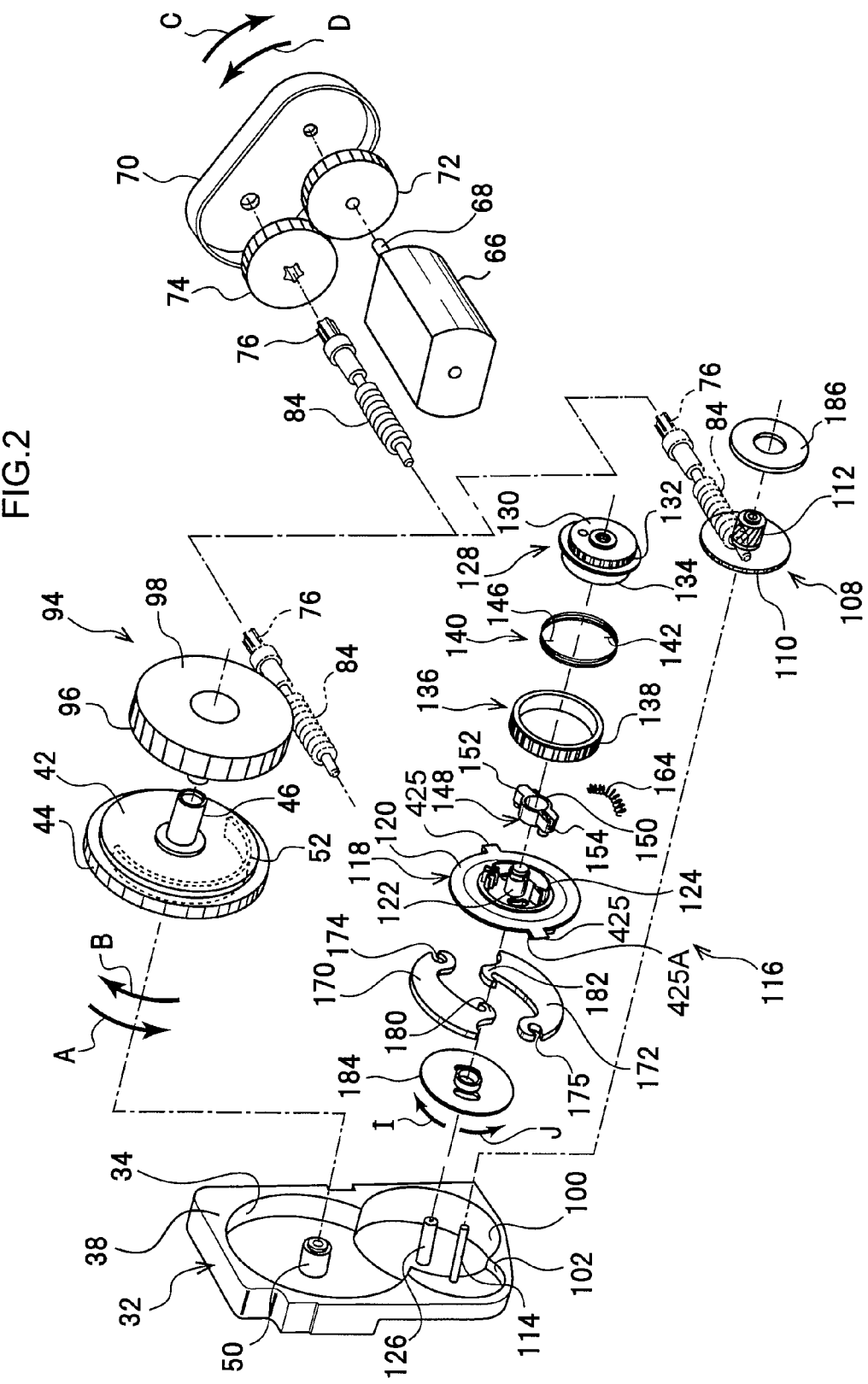
FIG. 2 is an exploded perspective view illustrating a configuration of relevant portions of a webbing take-up device according to the first exemplary embodiment.

The webbing take-up device 10 is provided with the case 32 that configures a reverse rotation drive power transmission section. Specifically, as illustrated in FIG. 2, the case 32 includes a case main body 38 including a first housing portion 34 and second housing portion 100 that have circular cross-section profiles, and a third housing portion 102 that has a substantially semicircular cross-section shape. The case 32 further includes a thin, flat plate shaped cover 104 (see FIG. 5) that closes off the first housing portion 34, the second housing portion 100 and the third housing portion 102. Note that the cover 104 is mounted to the case main body 38 with for example screws, not shown in the drawings.

A barrel drum 42 that configures the reverse rotation drive power transmission section is housed inside the first housing portion 34 of the case main body 38.

The barrel 42 is formed in a bottomed circular cylinder shape that is open towards the opposite side to the leg plate 16 and has a short axial direction dimension. An outer peripheral portion of the barrel 42 is formed with outer teeth 44. The outer teeth 44 configure a spur gear.

A circular cylinder shaped coupling portion 46 projects coaxially to the barrel 42 from a leg plate 16 side face of the barrel 42 bottom wall. The coupling portion 46 is coaxially and integrally coupled to the support shaft portion 29 that penetrates the circular hole 30 of the leg plate 16.

A support shaft, not shown in the drawings, projects coaxially to the barrel 42 from the face, on the opposite side to the leg plate 16, of the barrel 42 bottom wall. The support shaft is rotatably supported by a shaft bearing (receiving) portion 50 that projects from a central portion of the first housing portion 34. The support shaft portion 29 side of the spool 20 is accordingly rotatably supported to the case 32 through the barrel 42.

Figure 3:
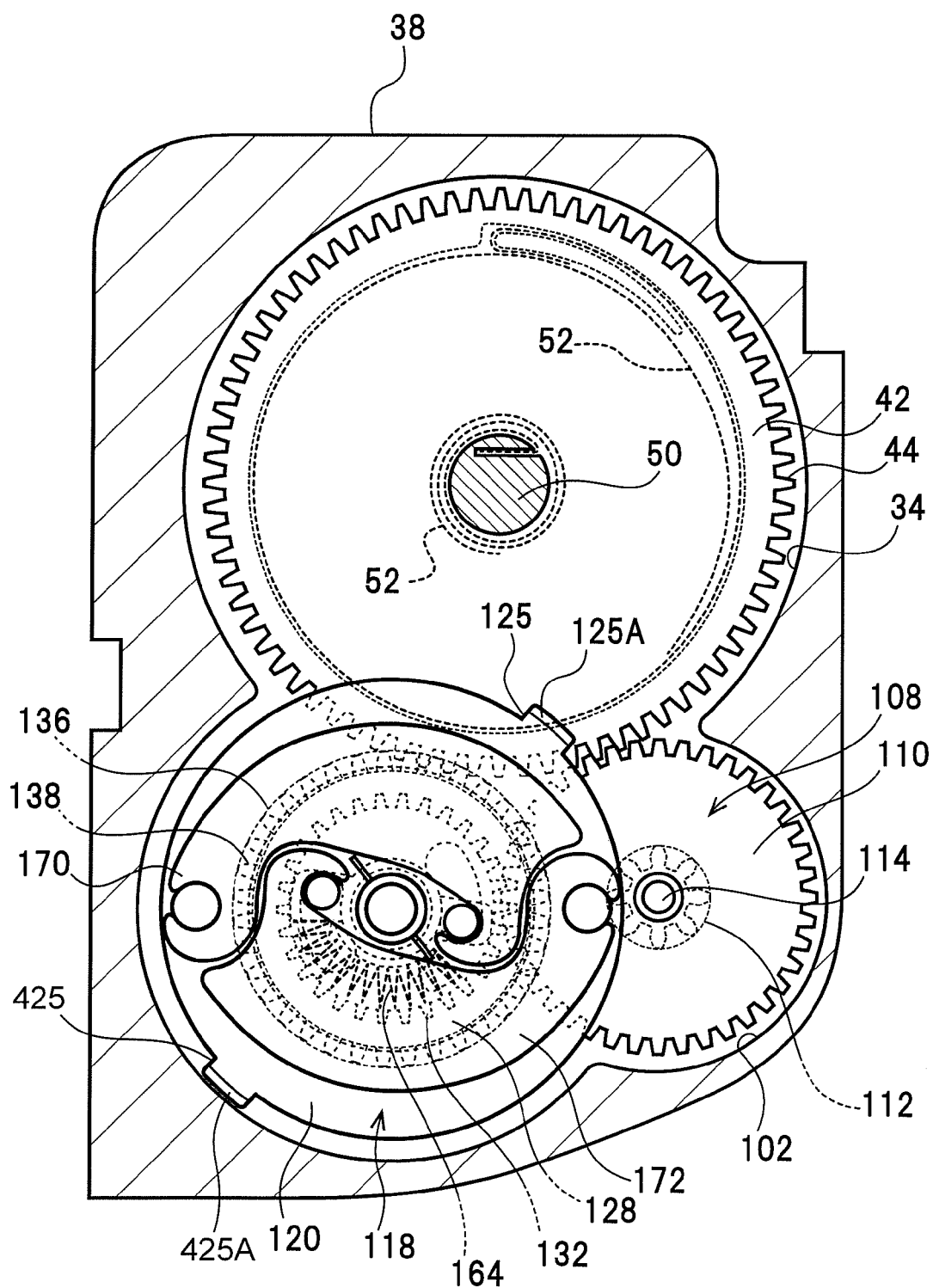
FIG. 3 is a side cross-section illustrating a partial configuration of a second clutch that is a configuration member of a webbing take-up device according to the first exemplary embodiment.

As illustrated in FIG. 3, a spiral spring 52 is housed inside the barrel 42. An inner end of the spiral spring 52 is anchored to the shaft bearing portion 50 of the case main body 38, and the outer end of the spiral spring 52 is anchored to the barrel 42. The spiral spring 52 biases the spool 20 towards the take-up direction through the barrel 42.

The biasing force of the spiral spring 52 (the take-up force on the webbing 28 due thereto) is set comparatively weak, but at a sufficient level to eliminate slack in the webbing 28 that has been fitted over an occupant. In other words, the biasing force of the spiral spring 52 is set with a strength that does not overpress the occupant in a fitted state of the webbing 28. There is no requirement to have sufficient strength for the webbing 28 that has been pulled out from the spool 20 to be completely taken up against frictional force and the like.

As illustrated in FIG. 1, the spool 20 includes a support shaft portion, not shown in the drawings, that projects coaxially from the flange portion 26 side end portion of the spool 20. This support shaft portion substantially coaxially penetrates through an internal-toothed ratchet hole 54 formed in the leg plate 18 and projects to the outside of the frame 12, and is rotatably supported by a substantially cup-shaped case 58 configuring a lock mechanism 56, fixed in a state in which an open end abuts and faces the outer face of the leg plate 18.

The lock mechanism 56 normally permits free rotation of the spool 20 in the take-up direction and the pull-out direction, whilst preventing rotation of the spool 20 in the pull-out direction during sudden vehicle deceleration. In the first exemplary embodiment configuration is made such that when an acceleration sensor 60 prevents pull-out direction rotation of a ratchet gear 61, relative rotation between the ratchet gear 61 and the spool 20 causes a lock plate 64 to project from a lock base 62 and mesh with the internal teeth of the ratchet hole 54 in the leg plate 18, thereby preventing rotation of the spool 20 in the pull-out direction. Note that configuration may be made such a torsion bar is coupled between the lock base 62 and the spool 20, and after locking as above, energy absorption is achieved (a force limiter function is achieved) by permitting rotation of the spool 20 in the pull-out direction as the torsion bar twists.

The webbing take-up device 10 is further provided with a motor 66. The motor 66 is disposed below the spool 20 between the pair of leg plates 16 and 18 of the frame 12, and is retained fixed to the frame 12 (not shown in the drawings). An output shaft 68 of the motor 66 projects towards the opposite side to the back plate 14, and a gear housing 70 is provided at the output shaft 68 side.

The gear housing 70 is integrally fixed to the frame 12 by a fastener such as a screw, with the leading end side of the output shaft 68 of the motor 66 rotatably supported by the gear housing 70.

As illustrated in FIG. 2, a pair of gears 72 and 74 respectively configuring external spur gear are housed in a mutually meshed state inside the gear housing 70. The gear 72 is integrally coaxially and attach-and-detachably coupled to the output shaft 68. The gear 74, that has a larger pitch circle and a greater number of teeth than the gear 72, is integrally coaxially and attach-and-detachably coupled to a worm shaft 76 with an axial direction parallel to the output shaft 68.

Figure 5:
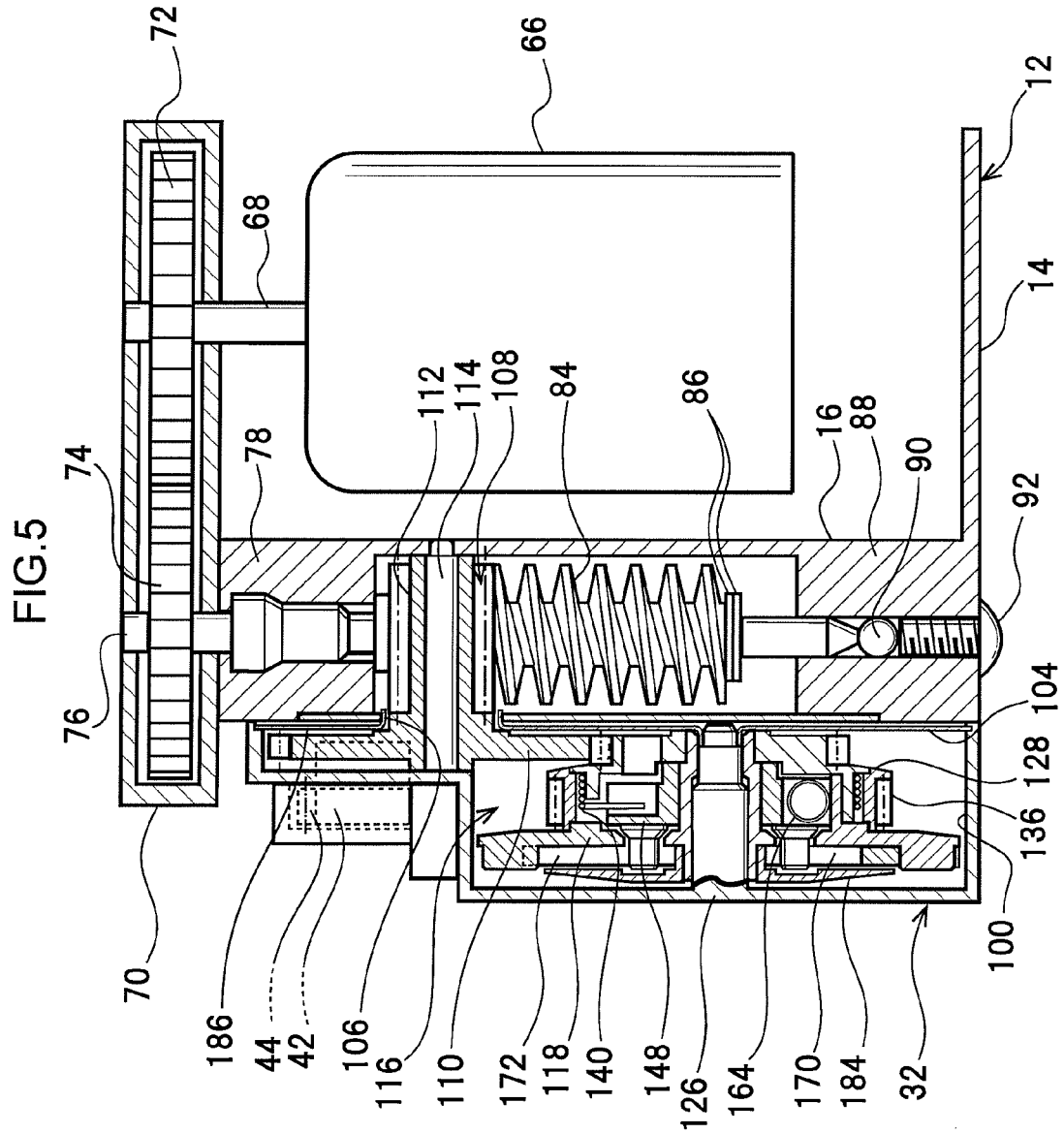
FIG. 5 is a plan view cross-section illustrating a configuration of peripheral members including a second clutch that is a configuration member of a webbing take-up device according to the first exemplary embodiment.

As illustrated in FIG. 5, the worm shaft 76 projects out from the gear housing 70, and one end side of the worm shaft 76 penetrates a shaft bearing (shaft receiving portion) 78 that is integrally formed to the leg plate 16. The other end side of the worm shaft 76 is provided with a shaft bearing (shaft receiving portion) 88. The shaft bearing 88 is configured with a substantially cylinder shape, with a steel ball 90 housed inside the shaft bearing 88. The external diameter dimension of the steel ball 90 is very slightly smaller than the internal diameter dimension of the shaft bearing 88, and the steel ball 90 is in contact with a tapered shaped end portion of the worm shaft 76.

On the opposite side of the worm shaft 76 to the steel ball 90, an inner peripheral portion of the shaft bearing 88 is configured with a female thread. An adjuster screw 92 is screwed into the shaft bearing 88 from an open end on the back plate 14 side. A leading end of the adjuster screw 92 presses the steel ball 90, thereby placing the steel ball 90 in press contact with the leading end of the worm shaft 76. Axial direction displacement of the worm shaft 76 is accordingly restricted.

Figure 4:
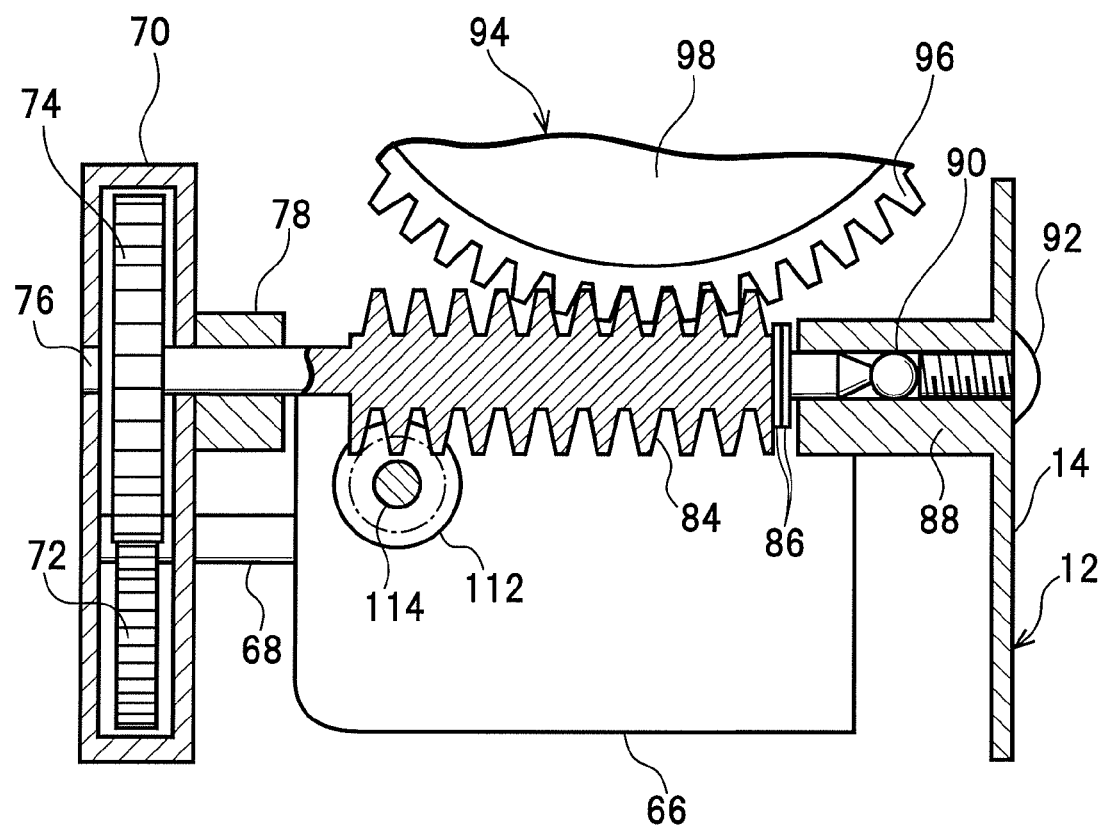
FIG. 4 is a side cross-section illustrating a configuration of peripheral members including a motor that is a configuration member of a webbing take-up device according to the first exemplary embodiment.

As illustrated in FIG. 4, a worm gear 84, that enmeshes with a worm wheel 96, described later, and with a worm wheel portion 112 of a split output gear 108, is integrally provided to the worm shaft 76 at an axial direction intermediate portion of the worm shaft 76.

As illustrated in FIG. 2, a first clutch 94 configuring a forward rotation drive power transmission section is provided above the worm gear 84 described above. The first clutch 94 is provided with the ring shaped worm wheel 96. The worm wheel 96 is provided between the leg plate 16 and the flange portion 24, coaxially to the spool 20 and capable of relative rotation thereto. Both axial direction ends of the worm wheel 96 are closed off by circular plate shaped members 98.

The first clutch 94 is provided with an adaptor, not shown in the drawings, that is a spool side member. The adaptor is integrally and coaxially provided between the support shaft portion 29 and the flange portion 24 of the spool 20, and penetrates the circular plate shaped member 98 of the worm wheel 96 so as to be capable of making sliding contact therewith, enmeshing the worm wheel 96 and the worm gear 84 and rotatably supporting.

A transmission member, not shown in the drawings, is housed inside the worm wheel 96. The first clutch 94 is configured such that take-up direction rotation (the arrow A direction in FIG. 2) of the worm wheel 96 joins together the worm wheel 96 and the adaptor such that rotation can be transmitted. The first clutch 94 is further configured to return to a released state of the mechanical join by the transmission member by pull-out direction rotation (the arrow B direction in FIG. 2) of the worm wheel 96, or by the worm wheel 96 becoming stationary (removing of load of the coupling member).

The first clutch 94 configured as above is thereby configured so as to transmit rotation force of the output shaft 68 of the motor 66 to the worm wheel 96 through the gears 72 and 74, the worm shaft 76 and the worm gear 84. The worm wheel 96 is rotated in the take-up direction (the arrow A direction in FIG. 2) on rotation of the output shaft 68 of the motor 66 in the forward direction (the arrow C direction in FIG. 2). The worm wheel 96 is rotated in the pull-out direction (the arrow B direction in FIG. 2) on rotation of the output shaft 68 of the motor 66 in the reverse direction (the arrow D direction in FIG. 2).

The split output gear 108 that configures the reverse rotation drive power transmission section is housed inside the third housing portion 102 of the case main body 38. The split output gear 108 includes a gear portion 110 as a spur gear, and the worm wheel portion 112 at whose outer peripheral portion worm wheel teeth are formed and that is integrally and coaxially provided to one axial direction end side of the gear portion 110. A circular through hole is formed at an axial center portion of the gear portion 110 and the worm wheel portion 112. A circular columnar shaped support rod 114 that projects from a bottom wall central portion of the third housing portion 102 is inserted into the through hole, supporting the split output gear 108 at the case main body 38 so as to be rotatable about the support rod 114.

The worm wheel portion 112 of the split output gear 108 has a smaller diameter than the gear portion 110, and passes through a through hole 106 (see FIG. 5) formed in the cover 104 so as to be exposed (project) to the outside of the case 32. The worm wheel portion 112 is enmeshed with the worm gear 84 configuring the forward rotation drive power transmission section. Configuration is accordingly such that when the worm gear 84 (worm shaft 76) rotates, both the worm wheel 96 and the split output gear 108 also rotate.

A second clutch 116 serving as a clutch configuring the reverse rotation drive power transmission section is housed inside the second housing portion 100 of the case main body 38.

Figure 6:
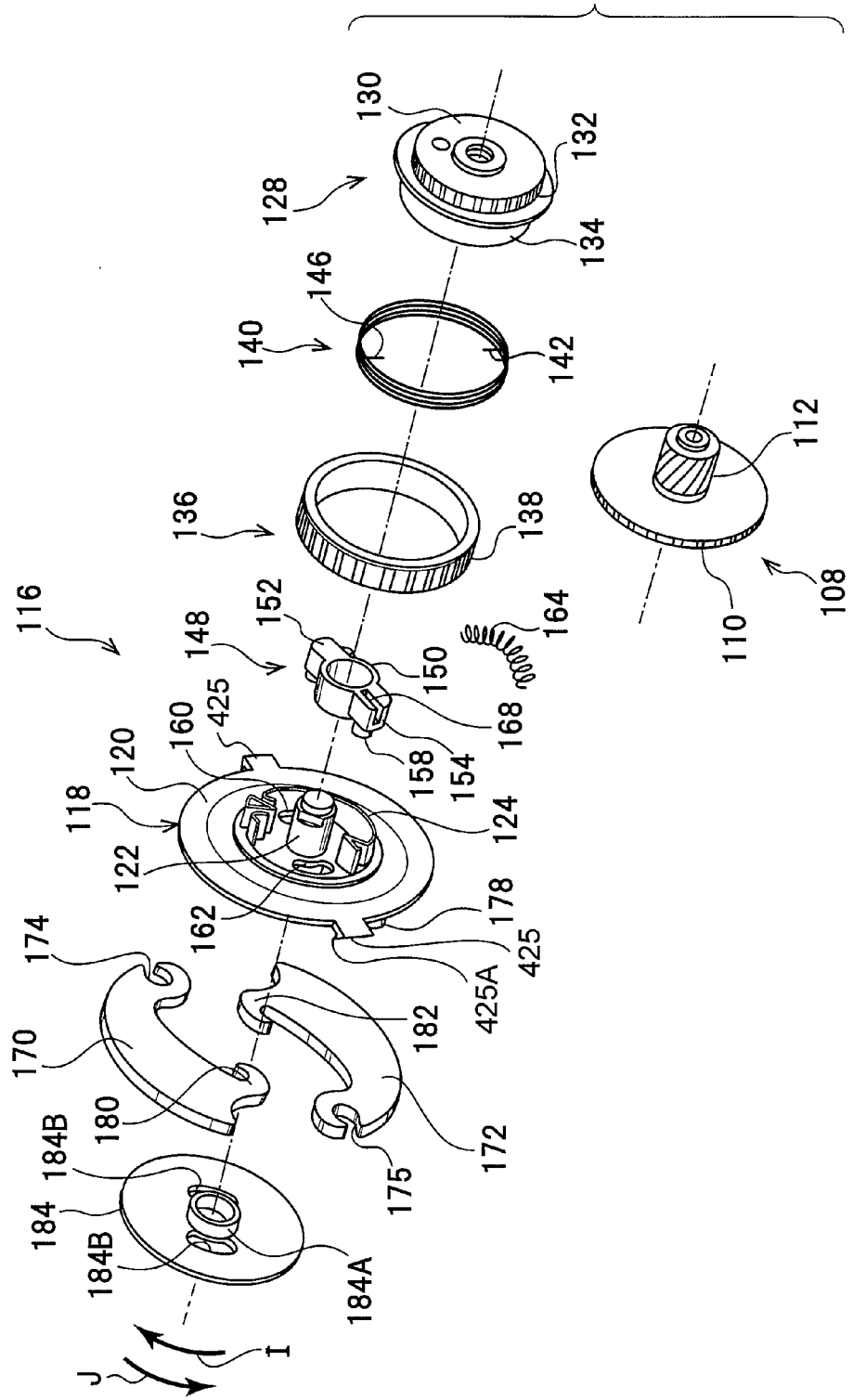
FIG. 6 is an exploded perspective view illustrating a configuration of relevant portions of a second clutch that is a configuration member of a webbing take-up device according to the first exemplary embodiment.
Figure 7:
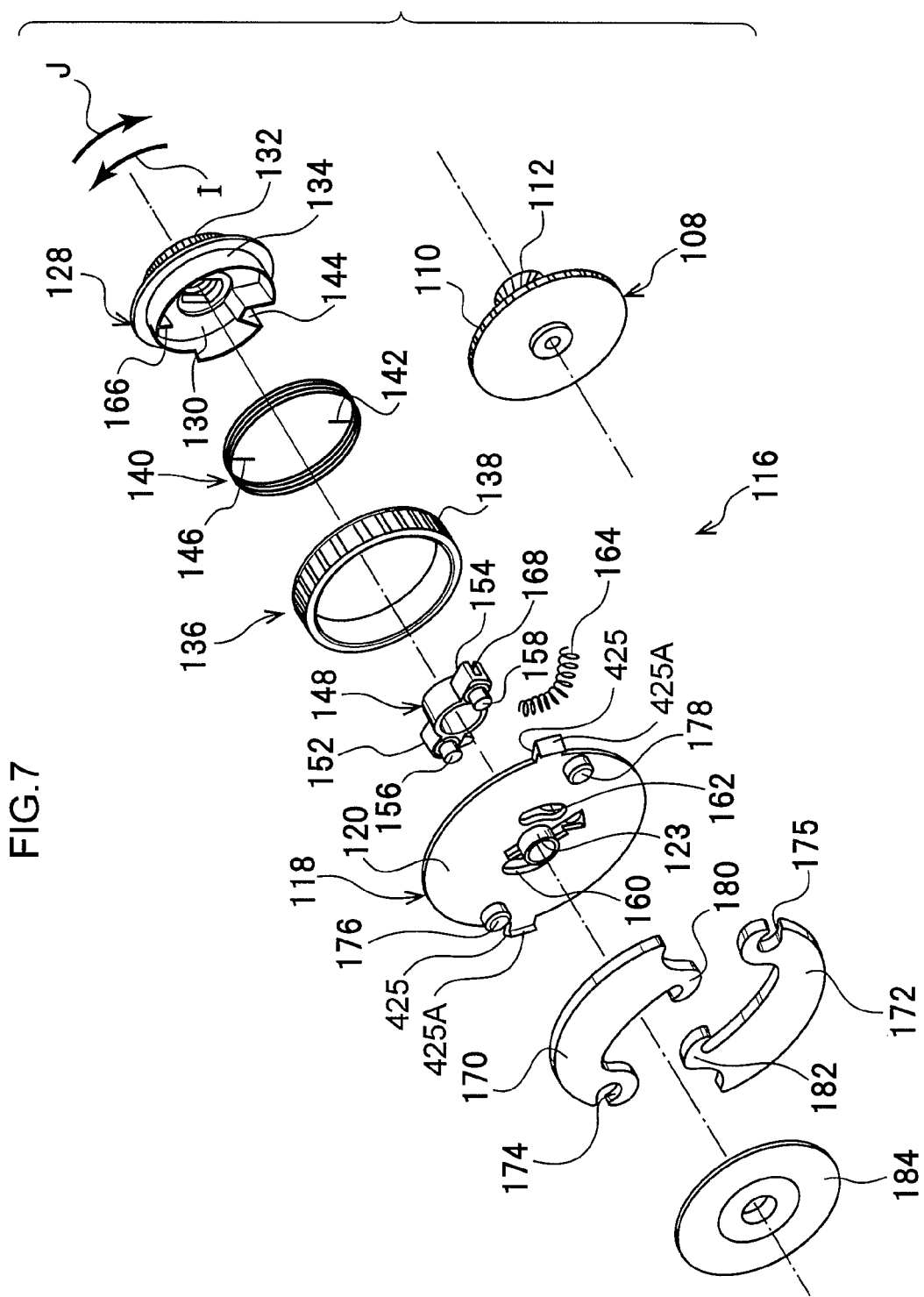
FIG. 7 is an exploded perspective view illustrating a configuration of relevant portions of a second clutch that is a configuration member of a webbing take-up device according to the first exemplary embodiment.
Figure 8:
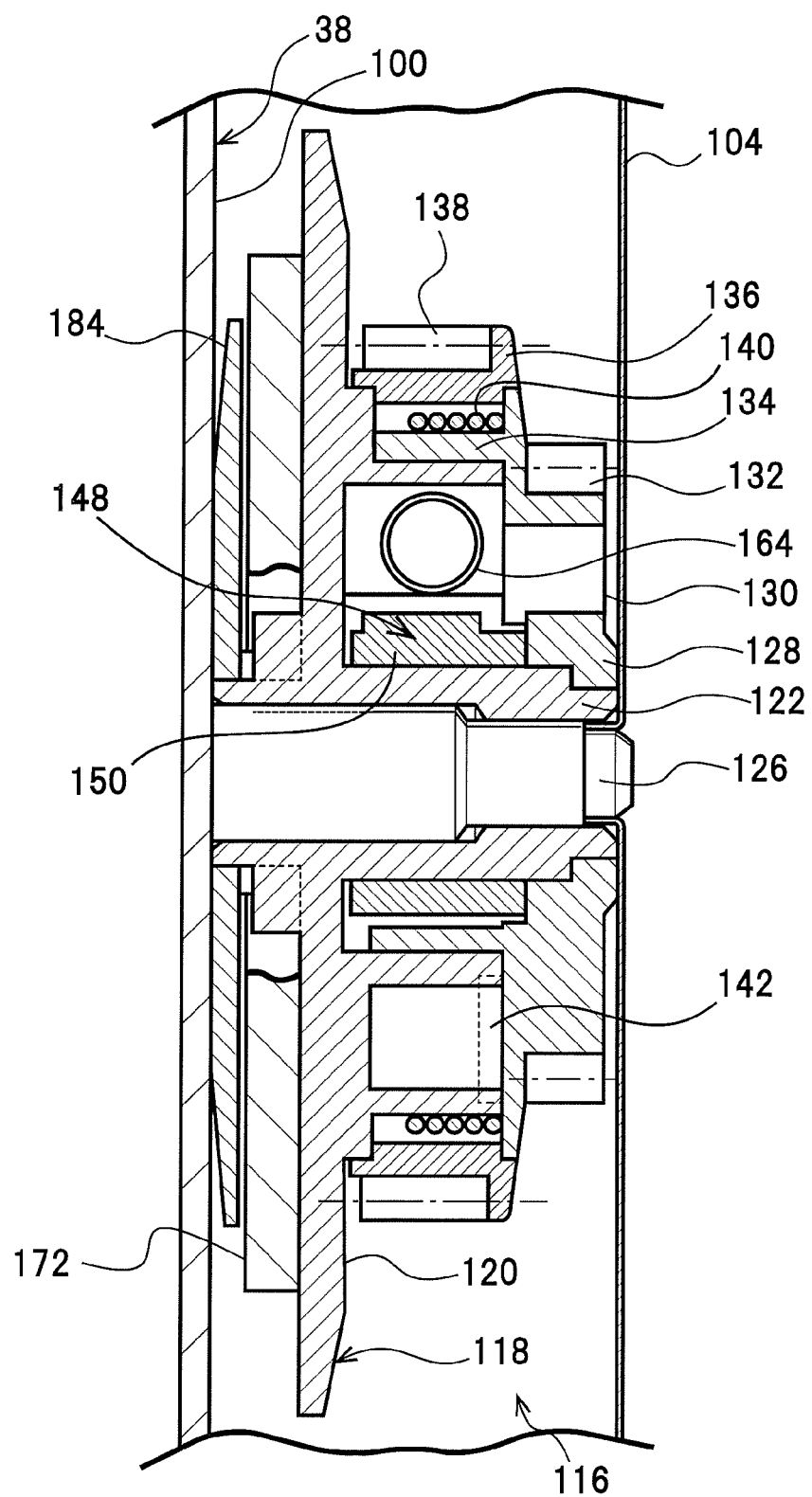
FIG. 8 is a cross-section illustrating a configuration of relevant portions of a second clutch that is a configuration member of a webbing take-up device according to the first exemplary embodiment.

FIG. 6 and FIG. 7 are exploded perspective views illustrating configuration of the second clutch 116. FIG. 8 is a cross-section illustrating configuration of the second clutch 116. As illustrated in FIG. 6, FIG. 7 and FIG. 8, the second clutch 116 is configured including a base 118, and a rotor 128, a clutch gear 136, a clutch spring 140 and a lever 148 that together configure a connection-disconnection mechanism.

The base 118 includes a main body portion 120 formed in a circular plate shape, a circular cylinder shaped support shaft portion 122 projecting towards one axial direction side of the main body portion 120 at an axial center portion of the main body portion 120, and a side wall portion 124 that is substantially C shaped in cross-section and that is formed coaxially to the support shaft portion 122 at the periphery thereof.

The base 118 is further provided with a pair of extension portions 425 formed so as to extend from an outer peripheral edge of the main body portion 120 towards the main body portion 120 radial direction outside. The extension portions 425 are disposed on opposite sides (opposite sides 180 degrees apart) to each other in the main body portion 120 circumferential direction. Leading end portions of the extension portions 425 are formed with projection portions 425A, serving as load limiting portions, that project towards weights 170 and 172, described later. Inner peripheral ends of the projection portions 425A are configured as abutted portions that are abutted by the deployed (opened out (outwardly moved)) weights 170 and 172, and are formed in substantially circular arc shapes centered on the same axis as the main body portion 120.

A support rod 126 projecting at a bottom wall central portion of the second housing portion 100 is inserted inside the cylinder of the support shaft portion 122, thereby supporting the base 118 described above at the case main body 38 so as to be rotatable about the support rod 126.

The rotor 128 that is formed in a substantially circular bottomed cylinder shape is coaxially provided to one axial direction side of the support shaft portion 122 (on the right hand side in FIG. 6 and FIG. 7). In a fitted state of the side wall portion 124 of the base 118 to the inside the cylinder of the rotor 128, the rotor 128 is integrally coupled to the base 118 along the circumferential direction. Spur outer teeth 132 are formed to an outer peripheral portion of a bottom wall 130 of the rotor 128. The outer teeth 132 enmesh with the gear portion 110 of the split output gear 108 described above.

The circular cylinder shaped clutch gear 136 is provided at the radial direction outside of a side wall portion 134 of the rotor 128, coaxially to and capable of relative rotation to the rotor 128. Spur outer teeth 138 are formed at an outer peripheral portion of the clutch gear 136. The outer teeth 138 enmesh with the outer teeth 44 of the barrel 42 described above. The internal diameter dimension of the clutch gear 136 is set sufficiently larger than the external diameter dimension of the side wall portion 134 of the rotor 128 such that a ring shaped gap is formed between the inner peripheral face of the clutch gear 136 and the outer peripheral face of the side wall portion 134. The clutch spring 140 that is a torsion coil spring is disposed coaxially in this ring shaped gap.

The dimension of the clutch spring 140 is set such that in a natural state, the internal diameter dimension of the clutch spring 140 is substantially the same as the external diameter dimension of the side wall portion 134 of the rotor 128. The external diameter dimension of the clutch spring 140 is set so as to be slightly smaller than the internal diameter dimension of the clutch gear 136 in a natural state. The clutch spring 140 is normally capable of relative rotation with respect to the clutch gear 136.

One winding direction end portion of the clutch spring 140 (the arrow I direction side end portion in FIG. 6 and FIG. 7) is configured with an anchored portion 142 extending towards the radial direction inside. The anchored portion 142 is fitted into and anchored to an anchor recess portion 144 (see FIG. 7) formed in the side wall portion 134 of the rotor 128.

A moving portion 146 extends towards the radial direction inside at the other winding direction end portion of the clutch spring 140 (the arrow J direction side end portion in FIG. 6 and FIG. 7). The moving portion 146 corresponds to the lever 148 that is disposed inside the rotor 128 cylinder (inside the side wall portion 134).

The lever 148 is provided with a circular cylinder shaped shaft receiving (bearing) portion 150. The support shaft portion 122 of the base 118 penetrates inside the cylinder of the shaft bearing portion 150, thereby supporting the lever 148 on the support shaft portion 122 (the base 118) so as to be capable of relative rotation about an axis. An outer peripheral portion of the shaft bearing portion 150 is provided with a pair of a coupling portion 152 and a coupling portion 154 projecting along the radial directions at opposite sides to each other (opposite sides 180 degrees apart) in the circumferential direction.

A coupling projection 156 and a coupling projection 158, respectively of circular column shape and projecting towards the main body portion 120 side of the base 118, are provided to project from the pair of coupling portions 152 and 154. The coupling projections 156 and 158 respectively penetrate a pair of an elongated hole 160 and an elongated hole 162 formed in the main body portion 120 of the base 118. The pair of elongated holes 160 and 162 are formed at opposite sides to each other (opposite sides 180 degrees apart) in the main body portion 120 circumferential direction and are respectively curved to follow the main body portion 120 circumferential direction. The coupling projection 156 and coupling projection 158 of the lever 148 are capable of moving inside the respective elongated holes 160 and 162 along the main body portion 120 circumferential direction. The rotation (turn) range of the of the lever 148 with respect to the base 118 is thereby limited due to the coupling projections 156 and 158 abutting one curve direction end portions or other curve direction end portions of the respective elongated holes 160 and 162. Note that the respective coupling projections 156 and 158 correspond to the pair of the weight 170 and the weight 172, described later.

One end portion of a return spring 164 that is a torsion coil spring is anchored to one coupling portion 152 of the lever 148. The other end portion of the return spring 164 is in contact with an anchor wall 166 formed at the side wall portion 134 of the rotor 128. The return spring 164 always biases the lever 148 towards the one direction about the base 118 axis (the arrow J direction in FIG. 6 and FIG. 7), and the lever 148 is normally retained with the pair of coupling projections 156 and 158 in an abut state with respective one curve direction end portions (the arrow J direction side end portions in FIG. 6 and FIG. 7) of the pair of elongated holes 160 and 162 of the main body portion 120.

Figure 9A:
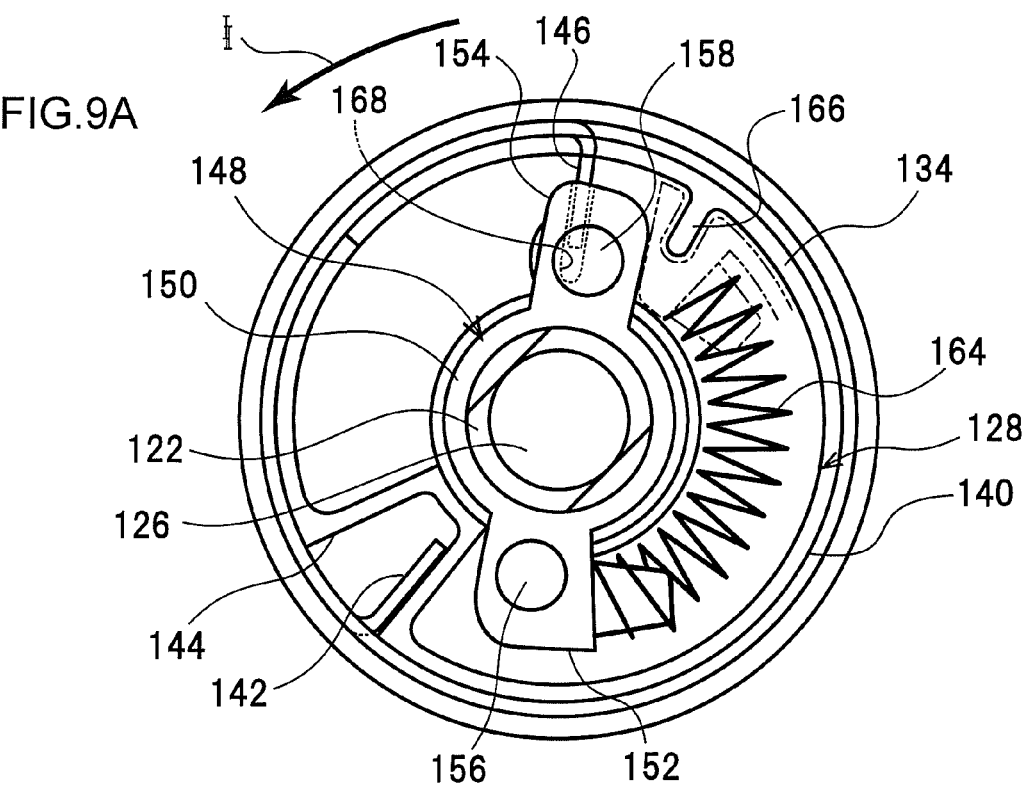
Figure 9B:
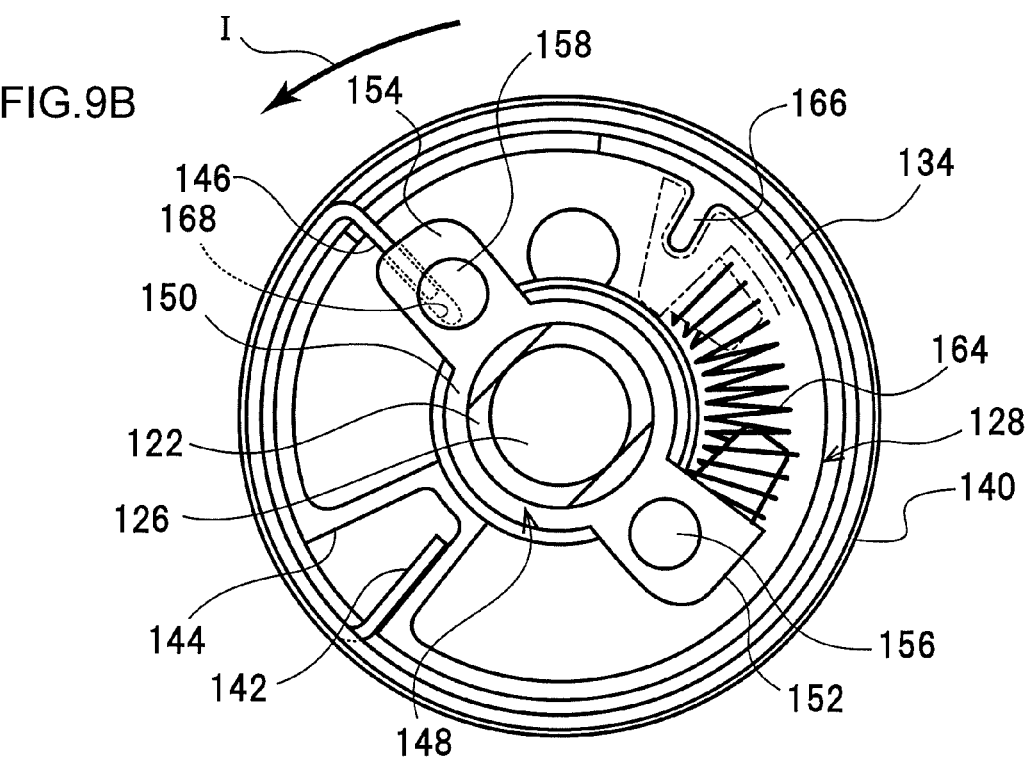

The other coupling portion 154 of the lever 148 is formed with an anchor groove 168, into which the moving portion 146 of the clutch spring 140 described above is fitted and anchored. As illustrated in FIG. 9A and FIG. 9B, when the lever 148 rotates towards the other direction (the arrow I direction in FIG. 9A and FIG. 9B) about the axis with respect to the base 118 (the rotor 128) against the resilient force of the return spring 164, the moving portion 146 of the clutch spring 140 moves towards one winding direction of the clutch spring 140 (the arrow I direction in FIG. 9A and FIG. 9B), such that the external diameter dimension of the clutch spring 140 increases.

Figure 10A:
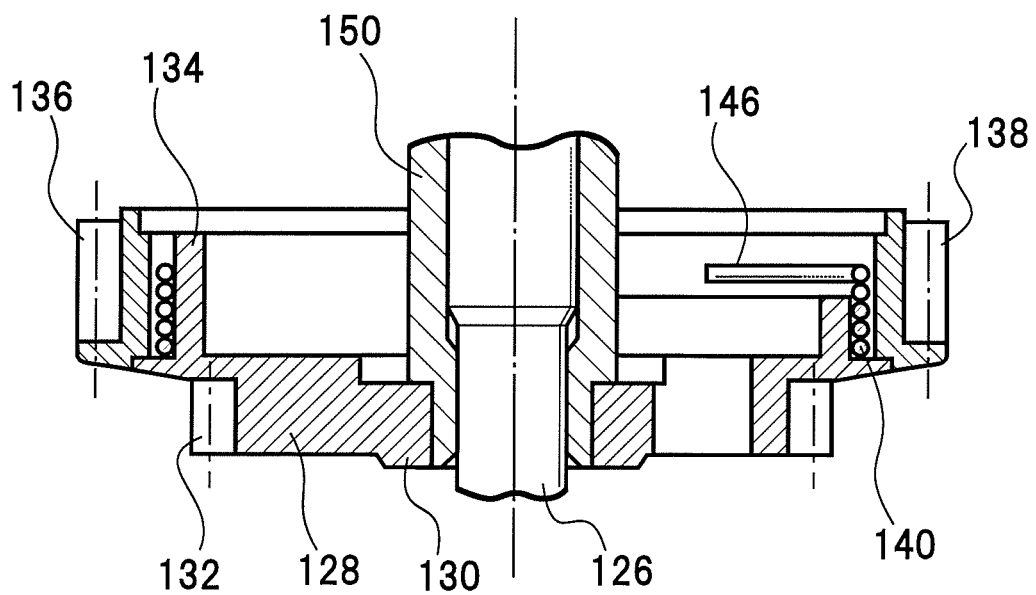
Figure 10B:
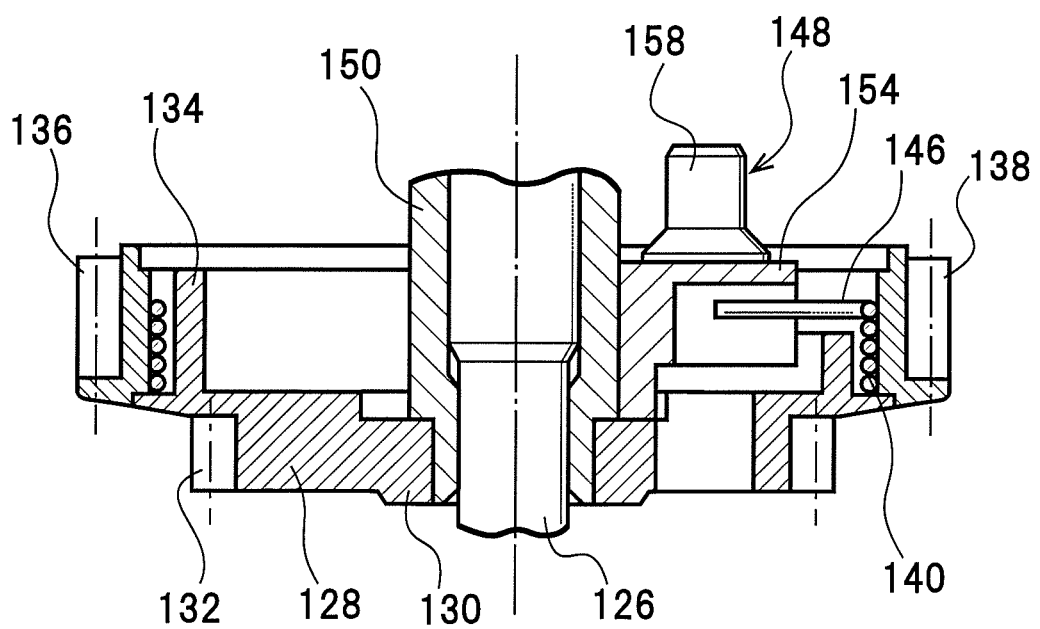

Moreover, when the external diameter of the clutch spring 140 increases thus, the outer peripheral portion of the clutch spring 140 presses against the inner peripheral face of the clutch gear 136 as illustrated in FIG. 10A and FIG. 10B. In this state, a specific frictional force arises between the outer peripheral portion of the clutch spring 140 and the inner peripheral face of the clutch gear 136, with this frictional force integrally coupling together the clutch spring 140 and the clutch gear 136.

As illustrated in FIG. 6 to FIG. 8, the respectively substantially semicircular plate shaped pair of the weight 170 and the weight 172, serving as clutch weight, are disposed at the axial direction other side of the base 118 (the opposite side to the rotor 128). The pair of weights 170 and 172 are both formed with the same weight as each other, and are provided at opposite sides to each other (opposite sides 180 degrees apart) in the main body portion 120 circumferential direction. Circular shaft receiving (bearing) holes 174 and 175 are formed at respective circumferential direction one end sides of the pair of weights 170 and 172. A circular column shaped support shaft 176 and support shaft 178 provided projecting from the main body portion 120 of the base 118 are rotatably fitted together with the bearing holes 174 and 175. The respective weights 170 and 172 are accordingly supported by the base 118 so as to be capable of rotating in the base 118 radial directions about the respective support shafts 176 and 178 (shaft bearing holes 174 and 175).

Figure 11A:
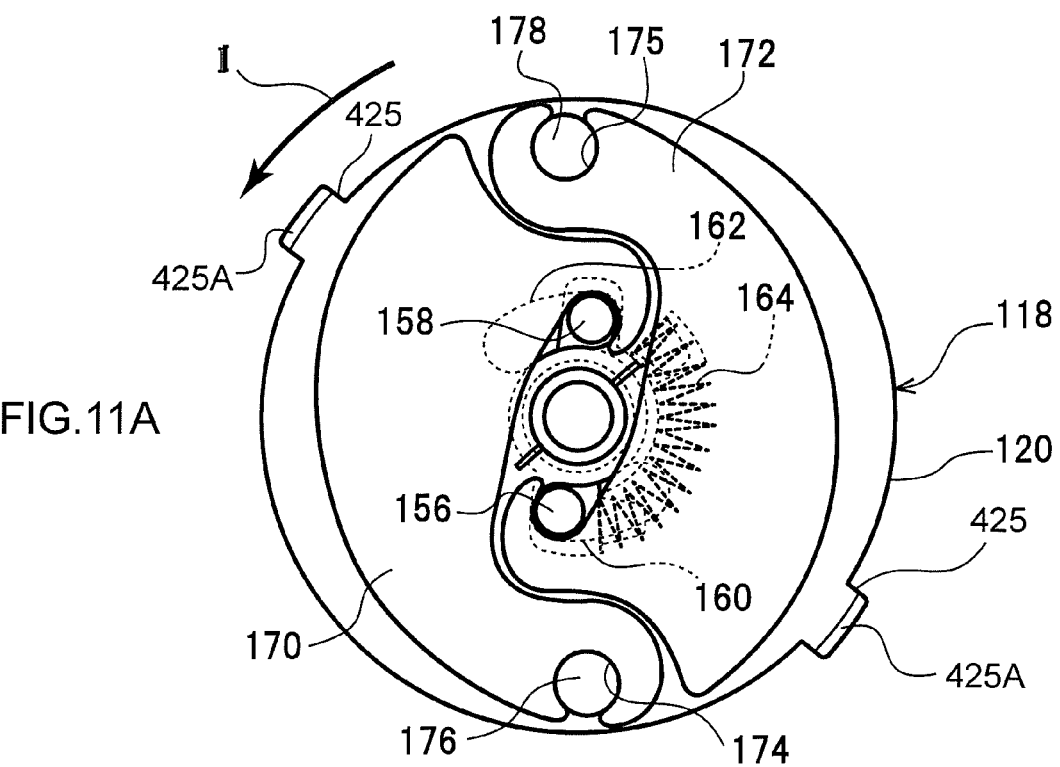

One of the weights, namely the weight 170, is provided with a substantially U-shaped engaging claw 180 that engages with the coupling projection 158 of the lever 148 described above. The other weight 172 is similarly provided with a substantially U-shaped engaging claw 182 that engages with the coupling projection 156 of the lever 148. The pair of the weight 170 and the weight 172 are accordingly synchronized (interlocked) through the lever 148. As illustrated in FIG. 11A, the weights 170 and 172 are normally retained on the base 118 radial direction inside by the biasing force of the return spring 164 acting on the lever 148.

As illustrated in FIG. 6 to FIG. 8, a circular disk shaped spacer 184 is disposed on the opposite side of the pair of weights 170 and 172 to the base 118. A cylinder shaped boss portion 184A is formed at a central portion of the spacer 184 and fits together with an outer peripheral portion of a cylinder shaped support shaft portion 123 that is in communication with the support shaft portion 122 of the base 118. The spacer 184 prevents the pair of weights 170 and 172 from coming off the base 118, and also prevents the pair of the weight 170 and the weight 172 from interfering with the bottom wall of the second housing portion 100 of the case main body 38. Note that the spacer 184 is formed with escape grooves 184B to prevent the spacer 184 from interfering with the respective coupling projections 156 and 158 provided and the lever 148.

Note that in the second clutch 116, when the rotor 128 rotates in one direction about its axis (the arrow I direction in FIG. 6 and FIG. 7), the base 118 that is integrally coupled to the rotor 128 also rotates in the one direction about its axis together with the rotor 128. The pair of the weight 170 and weight 172 supported on the base 118 follow the base 118, rotating about the axis of the base 118. When this occurs, centrifugal force acts on the pair of the weight 170 and weight 172, such that rotation torque about the support shaft 176 acts on the weight 170 and rotation torque about the support shaft 178 acts on the weight 172.

Figure 11B:
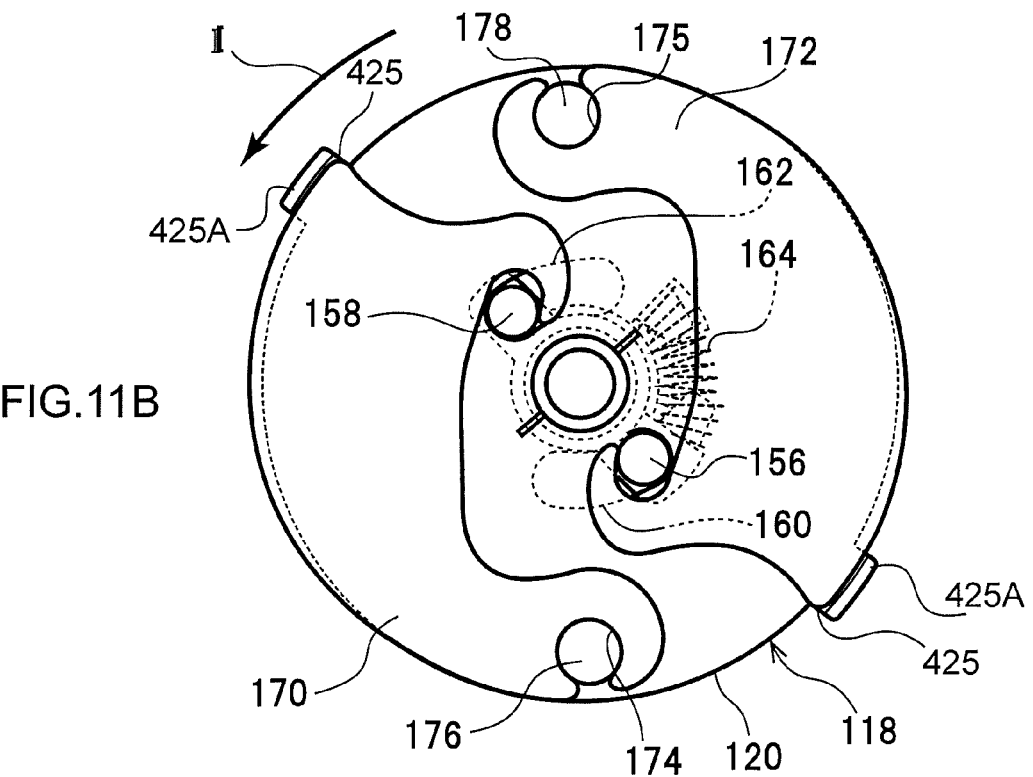
Figure 12:
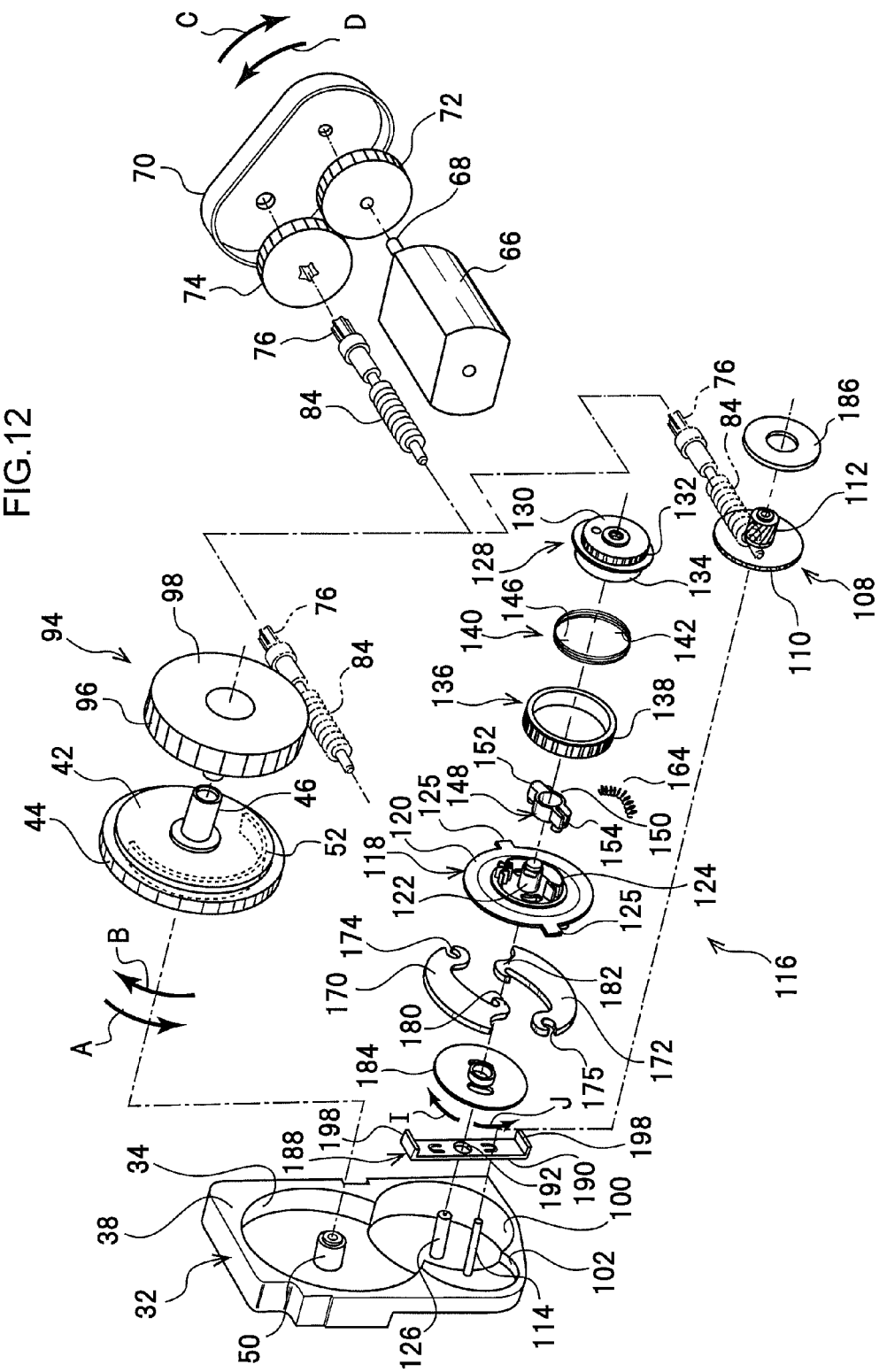
FIG. 12 is an exploded perspective view illustrating a configuration of relevant portions of a webbing take-up device according to the second exemplary embodiment.
Figure 13:
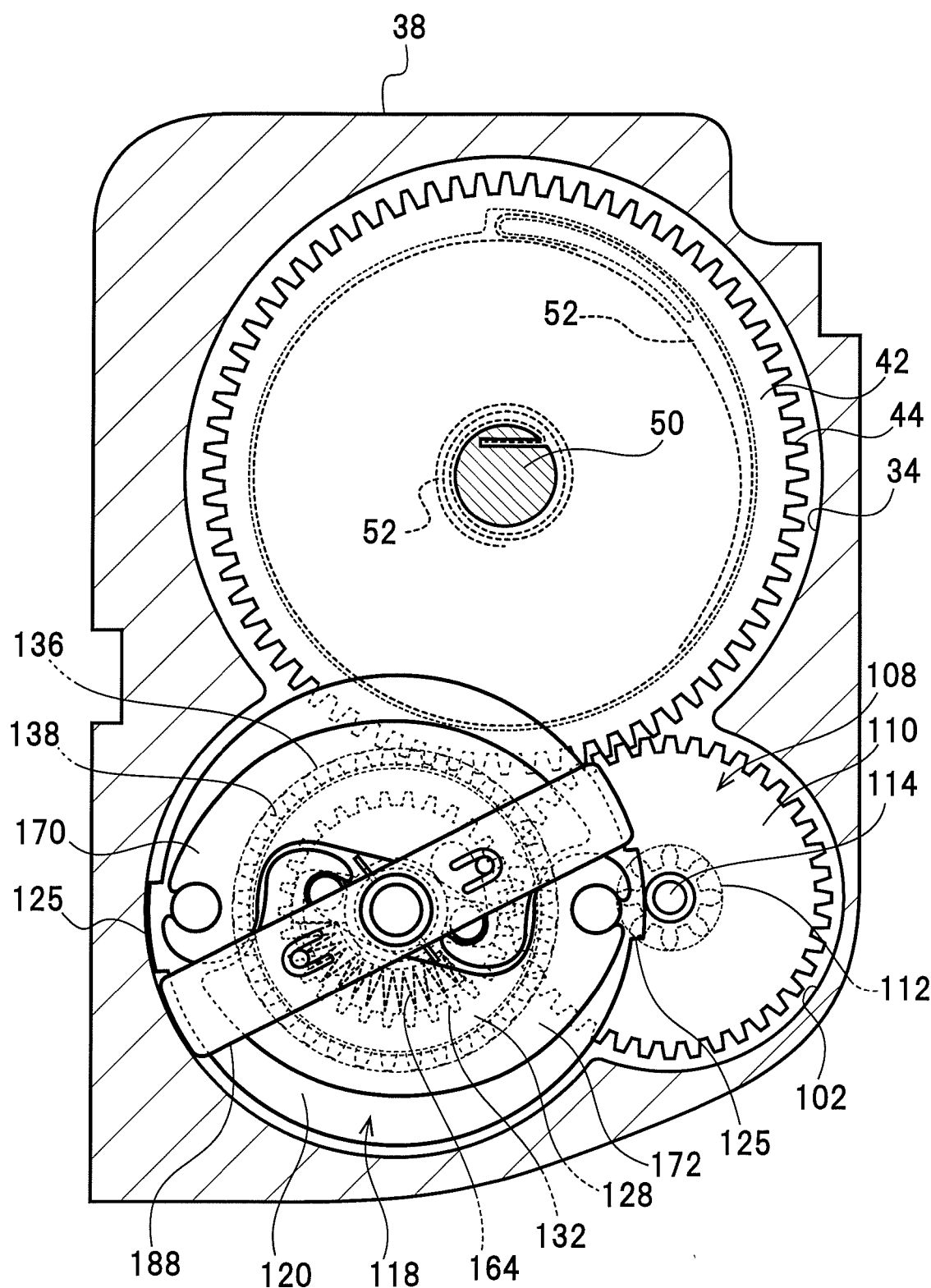
FIG. 13 is a side cross-section illustrating a partial configuration of a second clutch that is a configuration member of a webbing take-up device according to the second exemplary embodiment.
Figure 14:
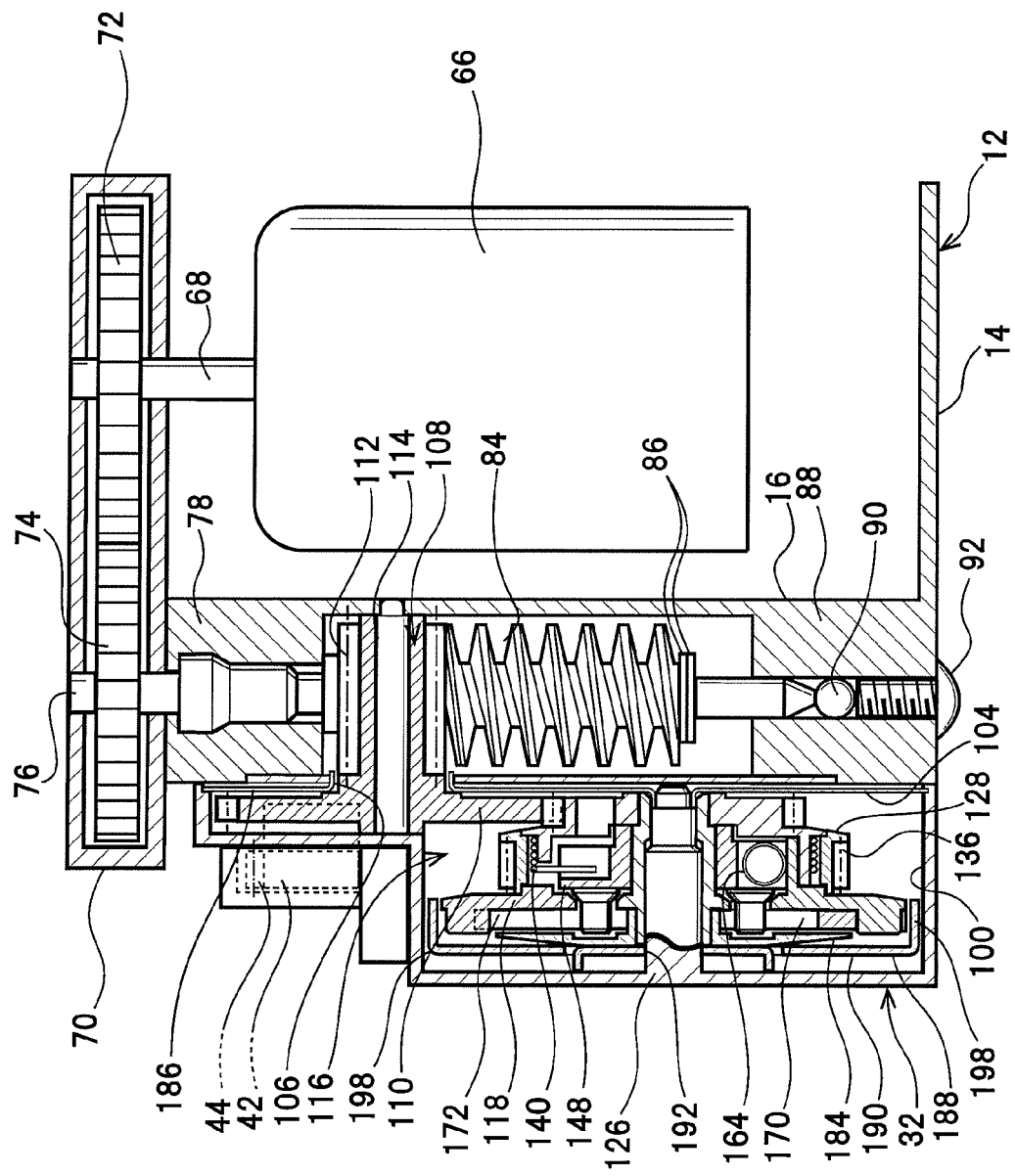
FIG. 14 is a plan view cross-section illustrating a configuration of peripheral members including a second clutch that is a configuration member of a webbing take-up device according to the second exemplary embodiment.

The pair of the weight 170 and weight 172 rotate (swing) about the support shaft 176 and the support shaft 178 towards the radial direction outside of the base 118 against the biasing force of the return spring 164 acting on the lever 148, as illustrated in FIG. 11B, when the value of the rotation torque is a specific value or higher, namely when the rotation speed of the pair of the weight 170 and weight 172 is a specific value or higher. Configuration is accordingly made such that the lever 148, with the coupling projection 158 engaged with the engaging claw 180 of the weight 170 and the coupling projection 156 engaged with the engaging claw 182 of the weight 172, rotates (swings) in the other direction (in the arrow I direction in FIG. 9A and FIG. 9B) about the axis with respect to the base 118.

In the second clutch 116 configured as described above, configuration is such that rotation force of the output shaft 68 of the motor 66 is transmitted to the rotor 128 through the gears 72 and 74, the worm shaft 76, the worm gear 84 and the split output gear 108. When the output shaft 68 of the motor 66 rotates in the forward direction (the arrow C direction in FIG. 2), the rotor 128 together with the base 118 are rotated in the other direction about the axis (the arrow J direction in FIG. 2). When the output shaft 68 of the motor 66 rotates in the reverse direction (the arrow D direction in FIG. 2), the rotor 128 together with the base 118 are rotated in the one direction about the axis (the arrow I direction in FIG. 2).

The total speed reduction ratio of the worm gear 84, the worm wheel portion 112 of the split output gear 108, the gear portion 110 of the split output gear 108, the outer teeth 132 of the rotor 128, the outer teeth 138 of the clutch gear 136 and the outer teeth 44 of the barrel 42 (reverse rotation drive power transmission section) is set sufficiently lower than the speed reduction ratio of the worm gear 84 and the worm wheel 96 (forward rotation drive power transmission section).

The second clutch 116 is configured overall as a unit integrally housed together with the barrel 42 and the split output gear 108 inside the single case 32 (the case main body 38 and the cover 104). The case 32 is detachably attached to the leg plate 16 of the frame 12 by for example screws, not shown in the drawings. A ring shaped packing 186 is provided at the periphery of the through hole 106 between the cover 104 of the case 32 and the leg plate 16 of the frame 12, in a configuration such that the packing 186 seals the inside of the case 32.

As illustrated in FIG. 1, in the webbing take-up device 10, power supply control to the motor 66 is configured by a controller 300. The controller 300 is configured by a driver 302 and an ECU 307. The motor 66 is electrically connected through the driver 302 to a battery 304 installed to the vehicle. Current from the battery 304 is supplied to the motor 66 through the driver 302. The driver 302 is connected to the ECU 307, in a configuration in which control of whether or not power is supplied to the motor 66 through the driver 302, as well as the direction and size of the supplied current, is performed by the ECU 307.

The ECU 307 is also respectively connected to a buckle switch 306 that outputs a signal according to whether or not the webbing 28 is fitted over an occupant, and to a forward monitoring device 308 that outputs a signal according to the distance between the vehicle and obstacles to the front of the vehicle.

The buckle switch 306 outputs an ON signal to the ECU 307 when a tongue plate provided to the webbing 28 is coupled to a buckle device (neither of these are illustrated in the drawings), and outputs an OFF signal to the ECU 307 when the coupled state of the tongue plate to the buckle device is released. Namely, the buckle switch 306 is configured so as to output either an ON signal or an OFF signal to the ECU 307 depending on whether or not the tongue plate and the buckle device are coupled together, this corresponding to whether or not the webbing 28 is fitted over an occupant.

The forward monitoring device 308 is provided with an infra-red sensor 310 in the vicinity of a vehicle front end section. The infra-red sensor 310 emits infra-red radiation to the front of the vehicle, and receives reflected infra-red radiation from other vehicle traveling or stationary or obstacle at the front side of the vehicle (for convenience, in the following explanation "obstacle" includes other vehicle which is moving or stationary).

Moreover, the forward monitoring device 308 is provided with a computation section 312. The computation section 312 computes the distance to an obstacle based on the length of time between infra-red radiation being emitted from the infra-red sensor 310 and the infra-red radiation reflected off the obstacle returning to the infra-red sensor 310. The computation section 312 further outputs to the ECU 307 an obstacle detection signal Os based on the computation results. The obstacle detection signal Os is Low level when the distance to an obstacle is a specific value or greater, and is High level when the distance to an obstacle is below the specific value.

Operation and Advantageous Effects of the First Exemplary Embodiment Explanation follows regarding operation and advantageous effects of the first exemplary embodiment.

In the webbing take-up device 10 configured as above, the webbing 28 is taken up onto and stored on the spool 20 in a layered state. In this state, pulling the webbing 28 by pulling the tongue plate, not shown in the drawings, pulls out the webbing 28 whilst rotating the spool 20 in the pull-out direction against the biasing force of the spiral spring 52 that biases the spool 20 in the take-up direction.

With the webbing 28 in this pulled out state, the webbing 28 is applied around the front of the body of an occupant seated in the seat and the tongue plate is inserted into the buckle device. The tongue plate is retained in the buckle device, thereby achieving an applied (fitted) state of the webbing 28 to the body of the occupant.

With the webbing 28 thus fitted over the occupant, the webbing 28 restrains the occupant comparatively gently with the biasing force of the spiral spring 52. In this state, the ECU 307 is input with an ON signal from the buckle switch 306.

When the occupant stops the vehicle and removes the tongue plate from the buckle device, the spool 20 rotates in the take-up direction under the biasing force of the spiral spring 52. Since the biasing force of the spiral spring 52 is set to be comparatively weak, the spool 20 rotates in the take-up direction with a comparatively weak rotation force corresponding to the biasing force of the spiral spring 52.

When this occurs, an OFF signal is input from the buckle switch 306 to the ECU 307. The ECU 307 that has been input with the OFF signal outputs a control signal to the driver 302 to begin power supply to the motor 66. The driver 302 that has been input with this control signal rotates the output shaft 68 of the motor 66 rapidly in the reverse direction. The rapid rotation of the output shaft 68 in the reverse direction is transmitted through the gears 72 and 74 to the worm shaft 76, and the worm gear 84 rotates rapidly.

The rapid rotation of the worm gear 84 is transmitted to the worm wheel 96 of the first clutch 94, rotating the worm wheel 96 in the pull-out direction at a rotation speed of the specific value or higher. In this case, at the worm wheel 96 and the adaptor (spool 20), a state in which the mechanical join by the transmission member is released is maintained. The worm wheel 96 and the adaptor (spool 20) accordingly slip-rotate (non-rotate) relative to each other.

However, the rapid rotation of the worm gear 84 is transmitted to the rotor 128 of the second clutch 116 through the split output gear 108, and the rotor 128 is rotated in the one direction about its axis at a rotation speed of the specific value or higher. The base 118 that is integrally coupled to the rotor 128 is accordingly rotated in the one direction about the axis at a rotation speed of the specific value or higher.

As illustrated in FIG. 11A, when the base 118 rotates in the one direction about the base 118 axis (the arrow I direction), the rotation of the base 118 is transmitted through the support shaft 176 and the shaft bearing hole 174 to the weight 170, and transmitted through the support shaft 178 and the shaft bearing hole 175 to the weight 172. As a result, the weight 170 and the weight 172 are rotated following the base 118 about the axis of the base 118 at a rotation speed of the specific value or higher. Centrifugal force accordingly acts on the weight 170 and the weight 172, so the weights 170 and 172 moving so as to deploy (open out). The weight 170 and the weight 172 rotate about the support shafts 176 and 178 towards the radial direction outside of the base 118 against the biasing force of the return spring 164 that acts on the lever 148.

The lever 148 of which the coupling projection 158 is engaged with the engaging claw 180 of the weight 170 and the coupling projection 156 is engaged with the engaging claw 182 of the weight 172 is accordingly rotated (swung) with respect to the base 118 towards the other direction about the axis with respect to the base 118 (the arrow I direction in FIG. 9A and FIG. 9B).

When the lever 148 is rotated towards the other direction about the axis with respect to the base 118, the moving portion 146 of the clutch spring 140 is moved towards the one winding direction (the arrow I direction in FIG. 9A and FIG. 9B) of the clutch spring 140 by the lever 148. As a result, as illustrated in FIG. 10A and FIG. 10B, the external diameter dimension of the clutch spring 140 increases, and the outer peripheral portion of the clutch spring 140 is pressed against the inner peripheral face of the clutch gear 136. The rotation of the clutch spring 140 is accordingly transmitted to the clutch gear 136, and the clutch gear 136 is rotated in the one direction about the axis. The outer teeth 138 of the clutch gear 136 are enmeshed with the outer teeth 44 of the barrel 42, so the barrel 42 is rotated in the take-up direction, and therefore the spool 20 is rotated in the take-up direction. This rotation of the spool 20 compensates for insufficient biasing force of the spiral spring 52, and the webbing 28 is taken up and stored in a layered state on the spool 20 (what is known as a "take-up assist mechanism").

Moreover, the spool 20 is rotated at low torque, and the webbing 28 can therefore be safely taken up and stored on the spool 20.

When the webbing 28 has been entirely taken up on the spool 20, the power supply to the motor 66 is shut off, and the rotation of the output shaft 68 of the motor 66 is stopped. The rotation of the rotor 128 accordingly stops, and the rotation of the base 118 that is integrally coupled to the rotor 128 also stops.

When the rotation of the base 118 stops, the weight 170 and the weight 172 rotate (swing) towards the radial direction inside of the base 118 under the resilient (elastic) force of the return spring 164 and the resilient (elastic) force of the clutch spring 140 acting on the lever 148. The clutch spring 140 accordingly returns again to its natural state and the outer peripheral portion of the clutch spring 140 comes away from the inner peripheral face of the clutch gear 136, immediately releasing the coupling between the clutch spring 140 and the clutch gear 136 described above. The coupling between the spool 20 and the output shaft 68 of the motor 66 by the second clutch 116 is accordingly released, thereby enabling the webbing 28 taken up on the spool 20 to be pulled out again.

While the vehicle is in a travelling state, the computation section 312 computes the distance of the obstacle which is in front of the vehicle from the vehicle based on the detection results of the infra-red sensor 310 of the forward monitoring device 308. For example, a Low level signal is output from the computation section 312 when no obstacles are present to the front of the vehicle, or when the obstacle is present in front of the vehicle but the distance therebetween is the specific value or greater. However, a High level signal is output from the computation section 312 when the distance between the vehicle and the obstacle which is in front of the vehicle is smaller than the specific value.

The ECU 307 outputs a specific operation signal to the driver 302 when the High level signal is input to the ECU 307 from the computation section 312. The driver 302 input with the operation level signal in this state begins power supply to the motor 66, rotating the output shaft 68 rapidly in the forward direction. The webbing 28 is accordingly taken up onto the spool 20, eliminating any slight looseness, referred to as "slack", from the webbing 28, and increasing the restraining force of the webbing 28 on the body of the occupant (what is referred to as a "pre-tensioner mechanism").

As described above, in the webbing take-up device 10 of the first exemplary embodiment, the two conflicting capabilities demanded by the take-up assist mechanism and the pre-tensioner mechanism can be provided by the single motor 66.

When the weight 170 and the weight 172 open out, as illustrated in FIG. 11B the weight 170 and the weight 172 make contact with (abut) the projection portions 425A provided to the base 118. In other words, the weight 170 and the weight 172 abut the projection portions 425A, thereby limiting the load input from the weight 170 and the weight 172 to the clutch spring 140 through the lever 148 so that it does not become a specific value or greater. As a result, the contact (engagement) load between the clutch spring 140 and the clutch gear 136 can be stabilized.

Note that in the first exemplary embodiment, explanation has been given of an example wherein the connection-disconnection mechanism is configured including the rotor 128, the clutch gear 136, the clutch spring 140 and the lever 148, however the present invention is not limited thereto. For example, another connection-disconnection mechanism configured such that clutch weights open out to allow rotation of an output shaft to be transmitted to a spool may also be applied.

In the first exemplary embodiment, explanation has been given of an example in which the weight 170 and the weight 172 abut the projection portions 425A provided to the base 118, thereby limiting the load applied to the connection-disconnection mechanism so as not to reach the specific value or greater, however the present invention is not limited thereto. For example, configuration may be made such that the elongated holes 160 and 162 serving as guide grooves provided to the base 118 are formed so as to limit the rotating range of the lever 148 within a specific range, thereby limiting the load applied to the connection-disconnection mechanism so as not to reach the specific value or greater.

Moreover, in the first exemplary embodiment, explanation has been given of the example of the webbing take-up device 10 provided with the first clutch 94 and the second clutch 116, however the present invention is not limited thereto. For example, it goes without saying that the present invention may be applied to a webbing take-up device provided with a single clutch that includes clutch weights.

Next, explanation follows regarding a webbing take-up device 400 of a second exemplary embodiment of the present invention, with reference to FIG. 1, FIG. 4 and FIG. 12 to FIG. 22. Note that in the following explanation of the second exemplary embodiment, locations and members similar to those to first exemplary embodiment are allocated the same reference numerals, and further explanation thereof is omitted.

Figure 15:
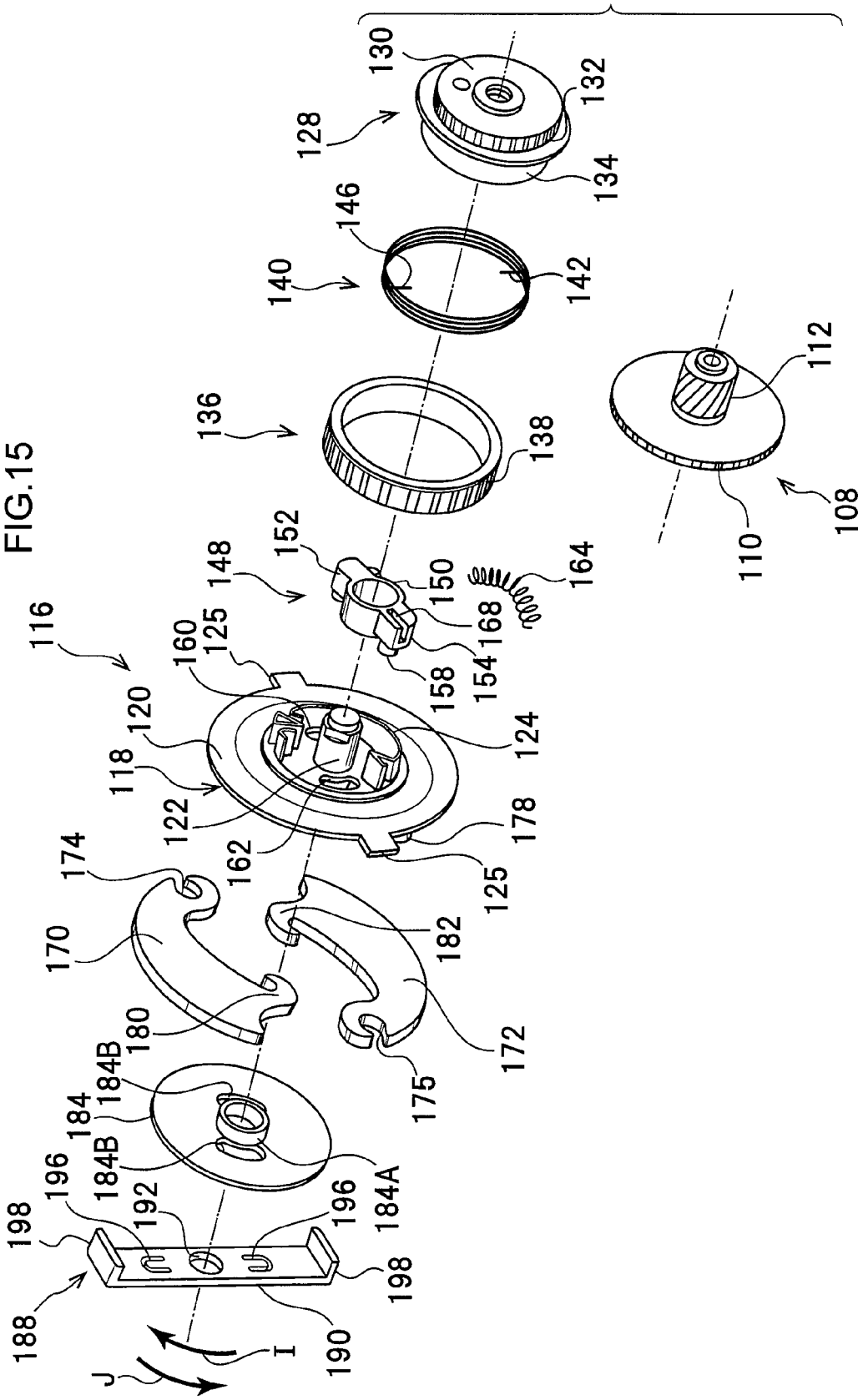
FIG. 15 is an exploded perspective view illustrating a configuration of relevant portions of a second clutch that is a configuration member of a webbing take-up device according to the second exemplary embodiment.
Figure 16:
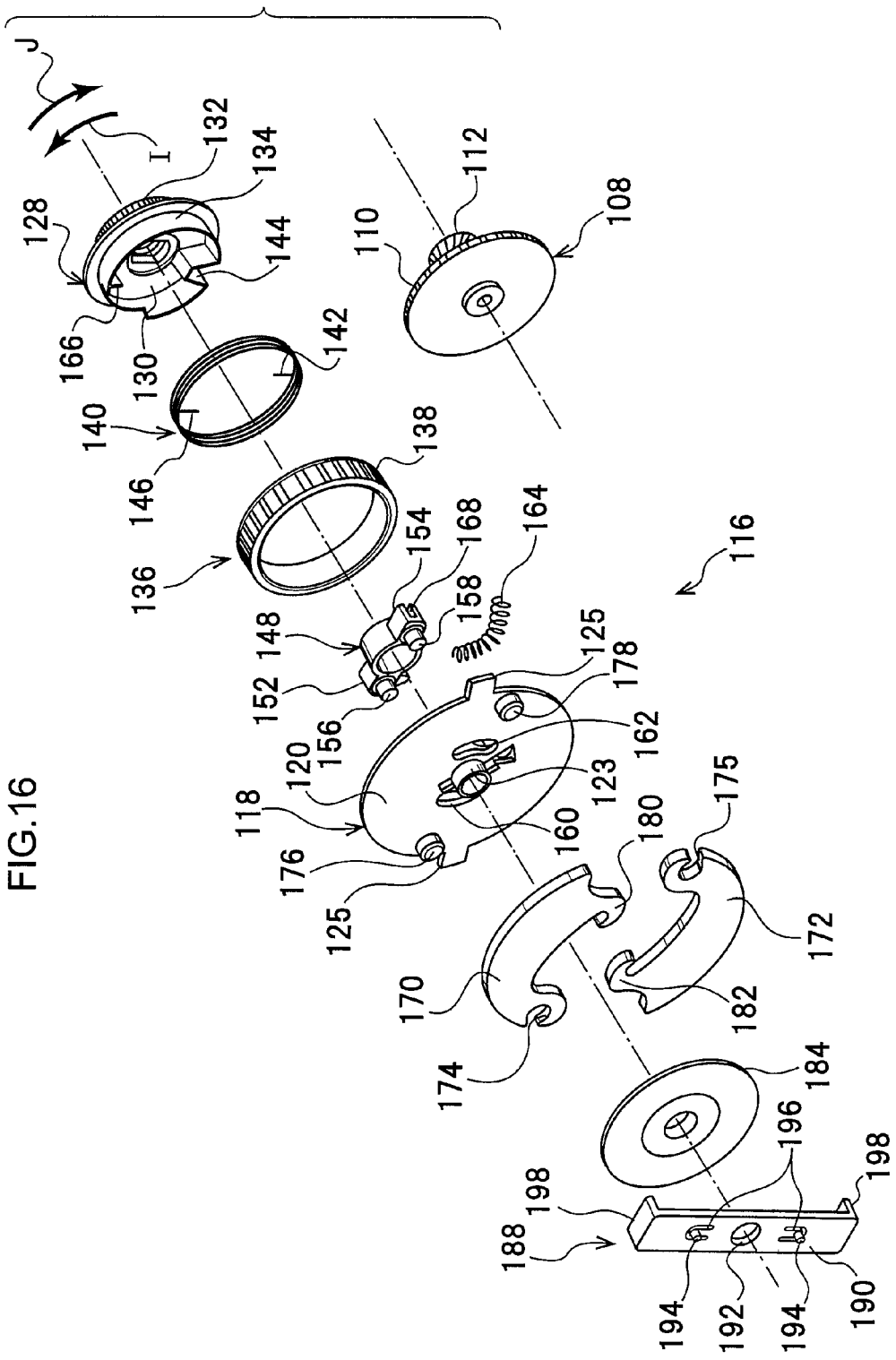
FIG. 16 is an exploded perspective view illustrating a configuration of relevant portions of a second clutch that is a configuration member of a webbing take-up device according to the second exemplary embodiment.
Figure 17:
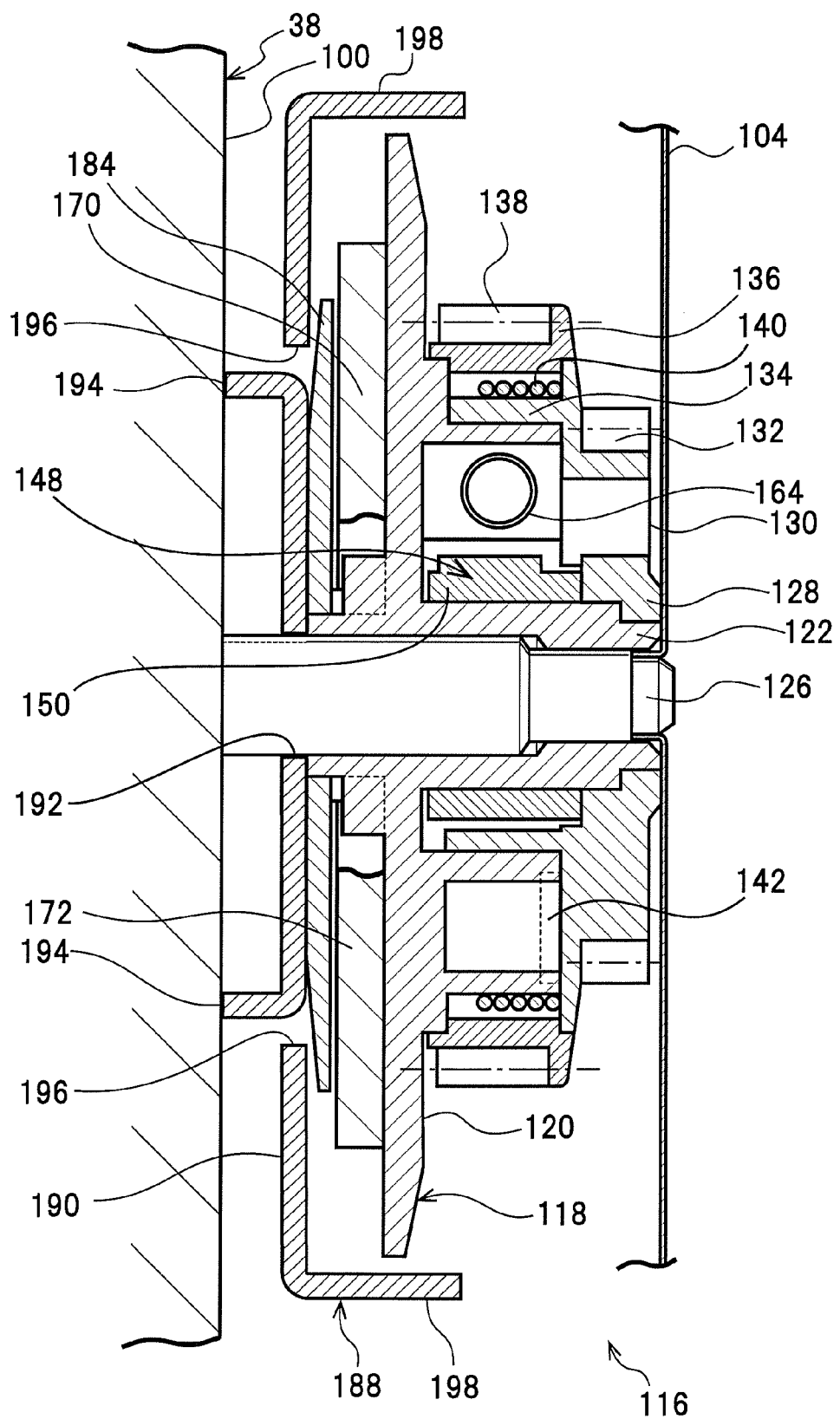
FIG. 17 is a cross-section illustrating a configuration of relevant portions of a second clutch that is a configuration member of a webbing take-up device according to the second exemplary embodiment.
Figure 18A:
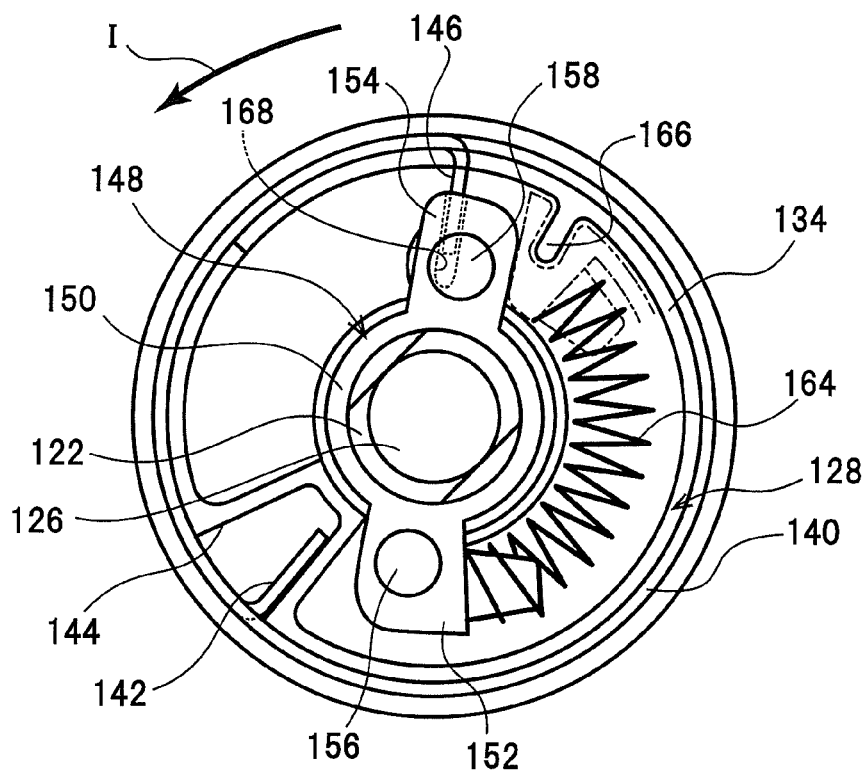
Figure 18B:
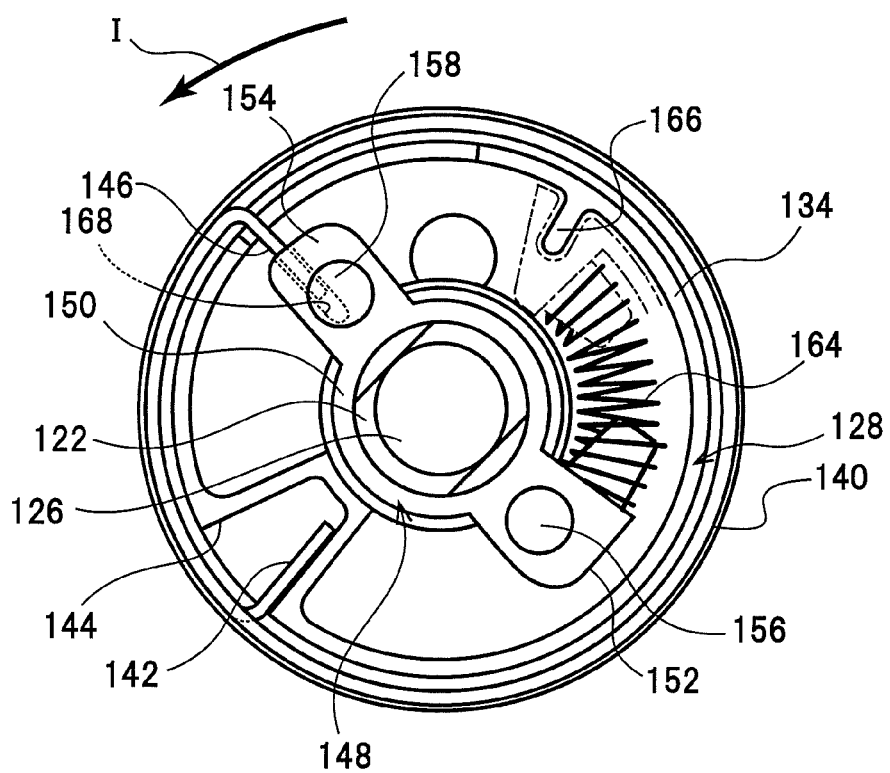
Figure 19A:
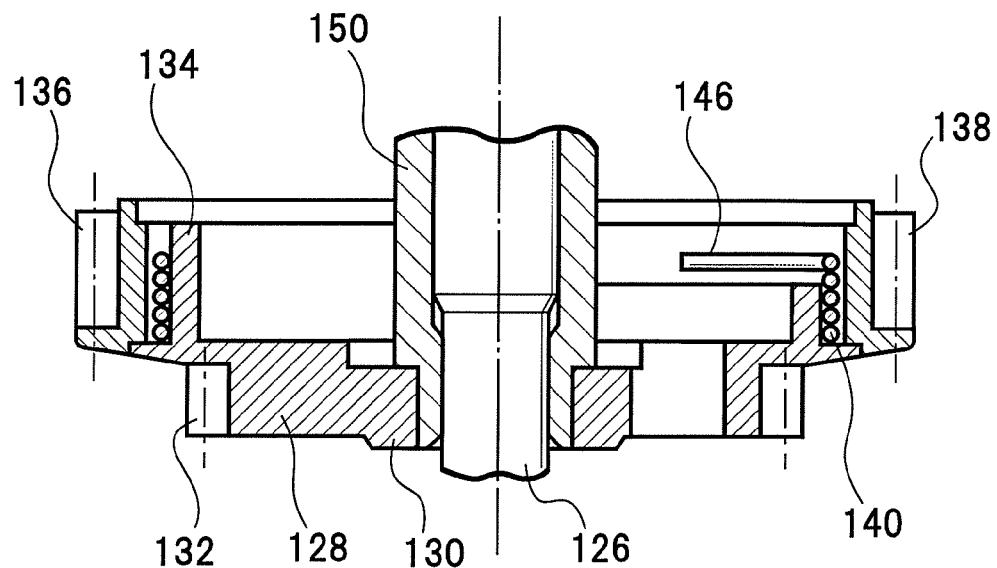
Figure 19B:
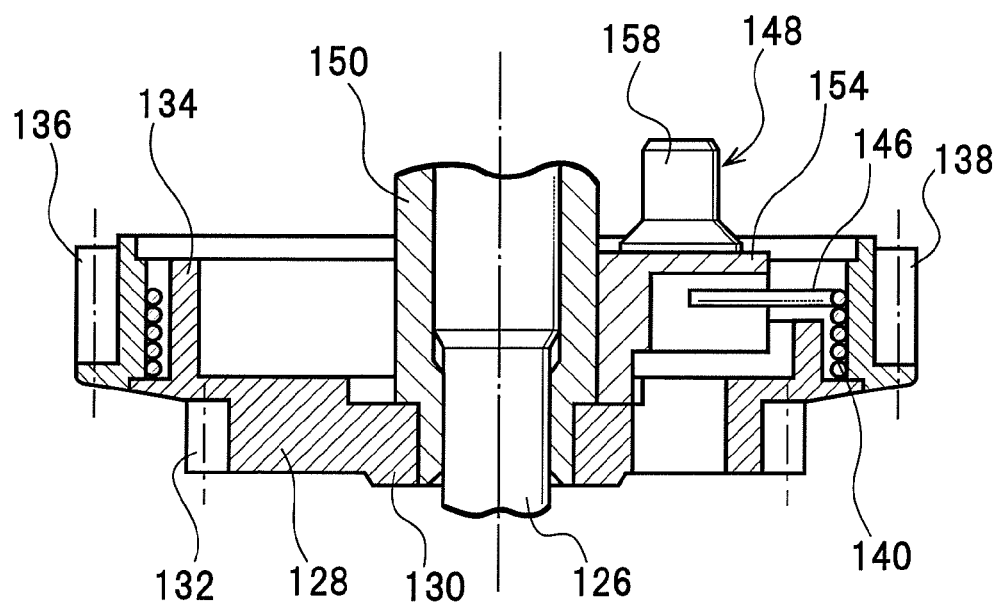

FIG. 15 and FIG. 16 are exploded perspective views illustrating configuration of a second clutch 116. FIG. 17 is a cross-section illustrating configuration of the second clutch 116. As illustrated in FIG. 15 to FIG. 17, the second clutch 116 is configured including the base 118, the rotor 128, the clutch gear 136, the clutch spring 140, the lever 148 and a stopper 188.

The base 118 is provided with pair of projection portions 125 formed so as to project out from an outer peripheral edge of the main body portion 120 towards the main body portion 120 radial direction outside. The projection portions 125 are disposed on opposite sides to each other (opposite sides 180 degrees apart) in the main body portion 120 circumferential direction. End portions on one circumferential direction side and the other circumferential direction side of the projection portions 125 of the main body portion 120 configure abut portions that abut peripheral wall portions 198 of the stopper 188, described later.

Figure 21A:
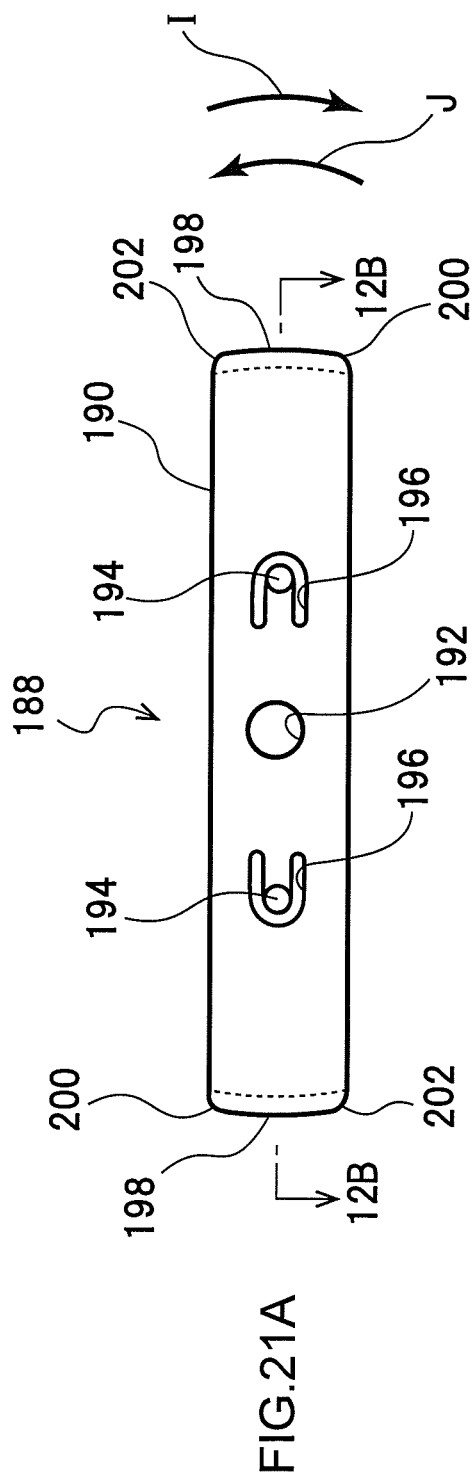
FIG. 21A is a plan view illustrating a stopper according to the second exemplary embodiment.
Figure 21B:
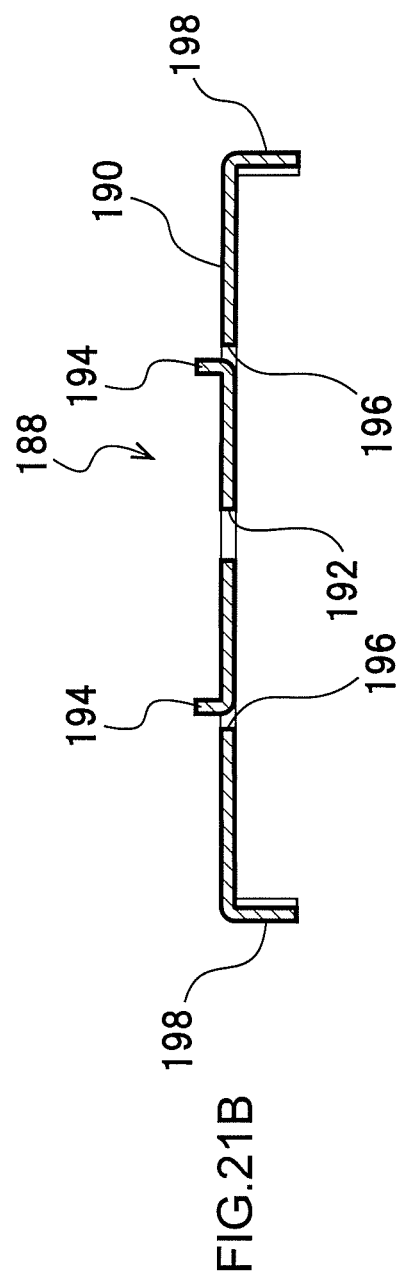
FIG. 21B is a cross-section of the stopper taken along line 12B-12B in FIG. 21A.

As illustrated in FIG. 15 and FIG. 16, the stopper 188 is provided on the opposite side of a spacer 184 to the base 118 and is formed in a substantially U-shape that is open towards the base 118. Specifically, as illustrated in FIG. 21A and FIG. 21B, the stopper 188 includes a general portion 190 that is substantially parallel to the main body portion 120 of the base 118 (see FIG. 16 and FIG. 17) and that extends such that the main body portion 120 radial direction is as a length direction of the general portion 190. The general portion 190 is moreover disposed coaxially to the support shaft portion 122 of the base 118, and is formed with an opening 192 into which is inserted the support rod 126 that projects at the bottom wall central portion of the second housing portion 100. In other words, the support rod 126 provided to the second housing portion 100 is inserted into the opening 192 of the general portion 190, thereby rotatably supporting the stopper 188 on the support rod 126.

The general portion 190 is moreover provided with a pair of projection portions 194 that are disposed at the radial direction outside of the opening 192 and formed so as to project in the direction of the bottom wall of the second housing portion 100. U-shaped openings 196 provided in the vicinity of base end portions of the projection portions 194 are formed so as to surround the projection portions 194. As a result, movement of the projection portions 194 in the opposite direction to the projection direction of the projection portions 194 is possible (portions at the projection portions 194 base end sides are deformed). Moreover, as illustrated in FIG. 17, in the inserted state of the support rod 126 provided to the second housing portion 100 into the opening 192 provided to the general portion 190 (in a supported state of the stopper 188 on the support rod 126), leading ends of the projection portions 194 abut (make contact) with the bottom wall of the second housing portion 100. More specifically, the leading ends of the projection portions 194 abut the bottom wall of the second housing portion 100 such that the stopper 188 does not rotate readily about the support rod 126 (rotation is restricted).

As illustrated in FIG. 21A and FIG. 21B, the stopper 188 is further provided with the peripheral wall portions 198 that respectively are bent at and extend from both length direction end portions of the general portion 190 towards the base 118. The internal diameter of the inner peripheral ends of the peripheral wall portions 198 is configured as an internal diameter which is slightly larger than the outer diameter of the outer peripheral ends of the main body portion 120 of the base 118. One end portions (the arrow I direction side end portions) and other end portions (the arrow J direction side end portions) of the peripheral wall portions 198 respectively configure first abutted (contacted) portions 200 and second abutted (contacted) portions 202 that are abutted (contacted) by the projection portions 125 (see FIG. 15 and FIG. 16) provided at the main body portion 120 of the base 118. The projection portions 125 provided to the main body portion 120 of the base 118 abut the first contacted portions 200 and the second contacted portions 202, thereby achieving a configuration in which the stopper 188 rotates together with the base 118.

Operation and Advantageous Effects of the Second Exemplary Embodiment Explanation follows regarding operation and advantageous effects of the second exemplary embodiment.

Note that in the following explanation, explanation of operation and advantageous effects similar to those of the first exemplary embodiment will be omitted.

Figure 20A:
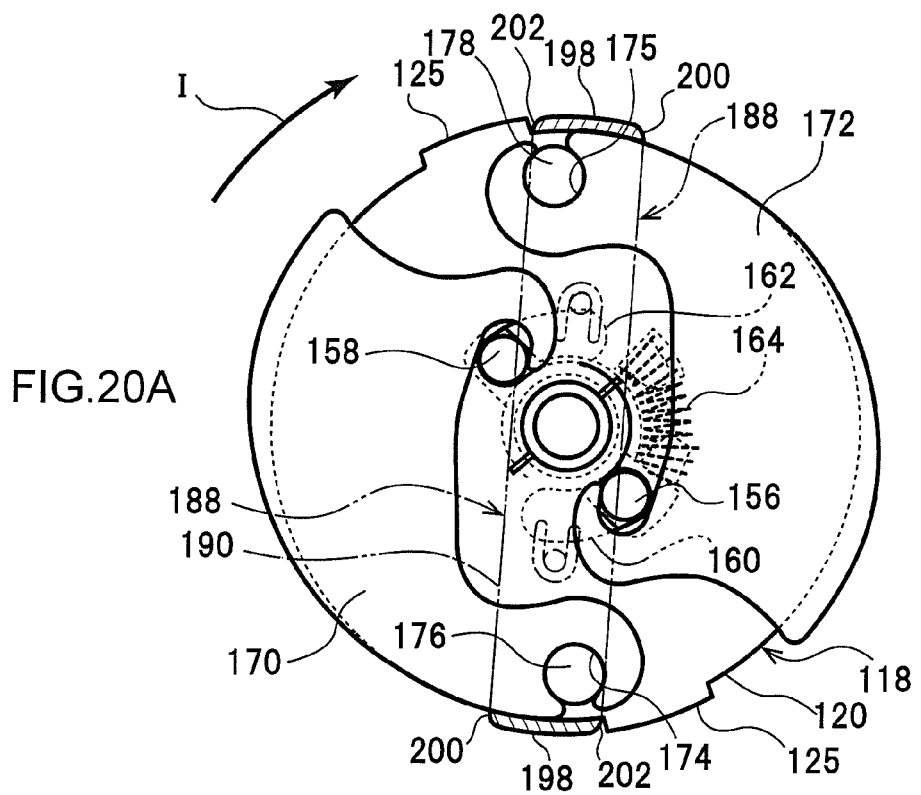

As illustrated in FIG. 20A, when the base 118 rotates in one direction about its axis (in the arrow I direction), the extension portions 125 provided to the main body portion 120 of the base 118 abut the second contacted portions 202 provided to the peripheral wall portions 198 of the stopper 188.

The rotation of the base 118 is transmitted to the weight 170 through the support shaft 176 and the shaft bearing hole 174, and is transmitted to the weight 172 through the support shaft 178 and the shaft bearing hole 175. The weight 170 and the weight 172 are rotated following the base 118 about the base 118 axis at a rotation speed of a specific value or higher. Centrifugal force accordingly acts on the weight 170 and the weight 172, as a result of which the weight 170 and the weight 172 open out. The weight 170 and the weight 172 rotate (swing) about the support shafts 176 and 178 towards the radial direction outside of the base 118 against the biasing force of the return spring 164 that acts on the lever 148.

Rapid rotation of the output shaft 68 in the forward direction is transmitted through the gears 72 and 74 to the worm shaft 76, and the worm gear 84 rapidly rotates. When this occurs, the rotation of the worm gear 84 is transmitted through the split output gear 108 to the rotor 128 of the second clutch 116, and the rotor 128 rotates in the other direction about its axis. The base 118 that is integrally coupled to the rotor 128 accordingly rotates in the other direction about its axis.

Figure 20B:
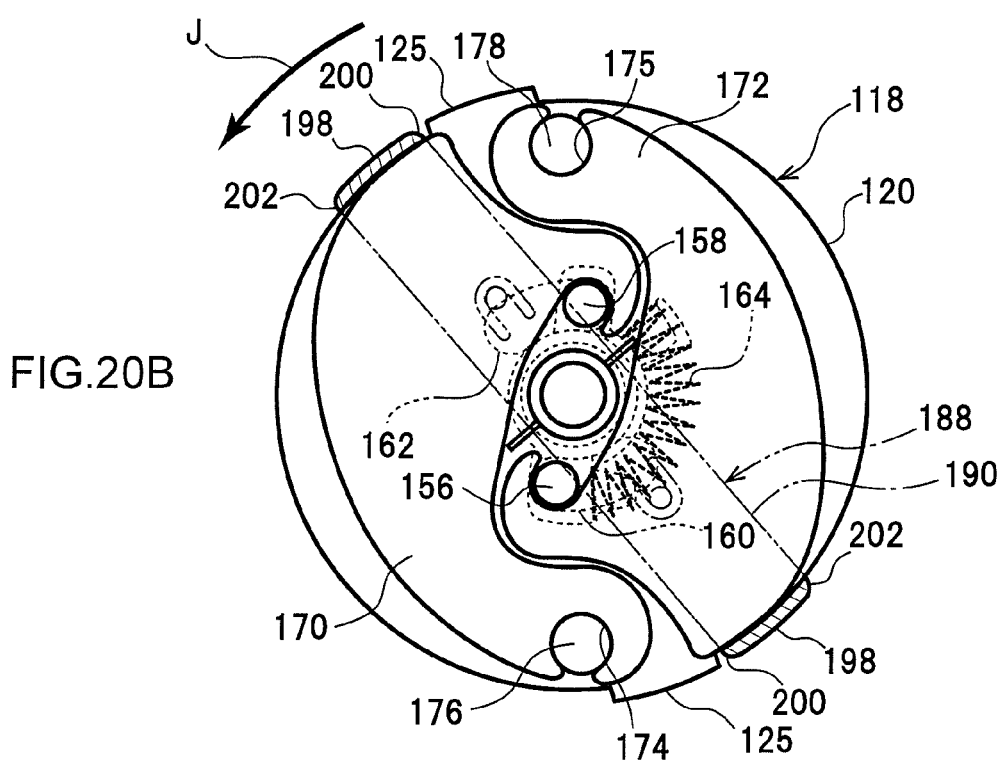

As illustrated in FIG. 20B, when the base 118 rotates in the other direction about its axis (in the arrow J direction), the projection portions 125 provided to the main body portion 120 of the base 118 abut the first contacted portions 200 provided to the peripheral wall portions 198 of the stopper 188.

Rotation of the base 118 is transmitted through the support shaft 176 and the shaft bearing hole 174 to the weight 170, and is transmitted through the support shaft 178 and the shaft bearing hole 175 to the weight 172, and the weight 170 and the weight 172 are rotated about the base 118 axis following the base 118 at a rotation speed of the specific value or higher. Centrifugal force accordingly acts on the weight 170 and the weight 172, as a result of which the weight 170 and the weight 172 open out. However, as illustrated in FIG. 20B, when the weight 170 and the weight 172 open out, the weights 170 and 172 abut the peripheral wall portions 198 of the stopper 188. In other words, the opening out of the weights 170 and 172 is restricted by the peripheral wall portions 198 of the stopper 188. Accordingly, when the output shaft 68 is rotating in the forward direction, the clutch spring 140 and the clutch gear 136 configuring the second clutch 116 do not engage with each other. As a result, the number of times that the clutch spring 140 and the clutch gear 136 configuring the second clutch 116 engage with each other is reduced, and the durability of the second clutch 116 can therefore be increased.

Moreover, in the second exemplary embodiment, when the base 118 rotates due to the output shaft 68 of the motor 66 rotating in the forward direction, the projection portions 125 provided to the base 118 abut the first contacted portions 200 provided to the peripheral wall portions 198 of the stopper 188. As a result, the stopper 188 is retained at a position that restricts opening out of the weights 170 and 172. When the base 118 rotates due to the output shaft 68 of the motor 66 rotating in the reverse direction, the projection portions 125 provided to the base 118 abut the second contacted portions 202 provided to the peripheral wall portions 198 of the stopper 188. As a result, the stopper 188 is retained in a position that permits opening out of the weights 170 and 172. Namely, in the second exemplary embodiment, due to the provision of the projection portions 125 configured as described above, the stopper 188 can be retained in a stable state at the position that restricts opening out of the weights 170 and 172 and at the position that permits opening out of the weights 170 and 172.

Moreover, in the second exemplary embodiment, the leading ends of the projection portions 194 provided to the stopper 188 abut the bottom wall of the second housing portion 100. Accordingly, the stopper 188 itself does not rotate until the projection portions 125 provided to the base 118 abut the first contacted portions 200 or the second contacted portions 202 provided to the peripheral wall portions 198 of the stopper 188. As a result, the timing at which the projection portions 125 provided to the base 118 abut the stopper 188 (the first contacted portions 200 or the second contacted portions 202) can be stabilized.

Note that in the second exemplary embodiment, explanation has been given regarding an example wherein the second clutch 116 is configured including the base 118, the rotor 128, the clutch gear 136, the clutch spring 140, and the lever 148, however the present invention is not limited thereto. For example the present invention may be applied to another webbing take-up device configured such that clutch weights open out to allow rotation of an output shaft to be transmitted to a spool.

Moreover, in the second exemplary embodiment, explanation has been given of an example wherein opening out of the weights 170 and 172 is restricted when the output shaft 68 of the motor 66 rotates in the forward direction by provision of the stopper 188, however the present invention is not limited thereto. Another mechanism may be employed wherein opening out of the weights 170 and 172 is restricted when the output shaft 68 of the motor 66 rotates in the forward direction and opening out of the weights 170 and 172 is permitted when the output shaft 68 of the motor 66 rotates in the reverse direction.

In the second exemplary embodiment, explanation has been given of an example configured wherein the projection portions 125 provided to the base 118 abut the stopper 188 (the first contacted portions 200 or the second contacted portions 202), thereby retaining the stopper 188 at either the position permitting opening out or the position restricting opening out of the weights 170 and 172, however the present invention is not limited thereto. Another configuration that can retain these two positions may also be applied.

In the second exemplary embodiment, explanation has been given of an example configured wherein the leading ends of the projection portions 194 provided to the stopper 188 are made to contact the bottom wall of the second housing portion 100, such that the stopper 188 itself does not rotate until the projection portions 125 provided to the base 118 abut the stopper 188 (the first contacted portions 200 or the second contacted portions 202). The present invention is however not limited thereto, and for example configuration may be made wherein the support rod 126 provided at the second housing portion 100 is press-fitted into the opening 192 provided at the general portion 190 of the stopper 188, such that the stopper 188 itself does not rotate until the projection portions 125 provided to the base 118 abut the stopper 188 (the first contacted portions 200 or the second contacted portions 202). In such cases, as illustrated in FIG. 22A and FIG. 22B, U-shaped holes 204 may be provided at peripheral edge portions of (near) the opening 192, so as to adjust the frictional force between the opening 192 and the support rod 126.

Explanation has been given above regarding exemplary embodiments of the present invention, however the present invention is not limited to the above, and obviously various modifications other than the above may be implemented within a scope not departing from the spirit of the present invention.

What is claimed is:

1. A webbing take-up device, comprising:
    a spool to which a base end side in a length direction of a webbing is anchored, the spool taking up and storing the webbing by rotating in a take-up direction;
    a spring that biases the spool towards the take-up direction;
    a motor that rotates an output shaft about an axis thereof by being supplied with power;
    a first clutch that is provided between the spool and the output shaft, that transmits, to the spool, forward direction rotation of the output shaft, which rotation is reduced in speed by a specified speed reduction ratio, that rotates the spool in the take-up direction, and that does not transmit rotation arising on the spool side to the output shaft; and a second clutch that is provided between the spool and the output shaft independently of the first clutch, the second clutch comprising a clutch weight that is restricted from deploying at a time of forward direction rotation of the output shaft and that is permitted to deploy at a time of reverse direction rotation of the output shaft, and as a result of deployment of the clutch weight, the second clutch transmitting, to the spool, reverse direction rotation of the output shaft, which rotation is reduced in speed by a speed reduction ratio lower than the specified speed reduction ratio, and rotating the spool in the take-up direction, and the second clutch not transmitting rotation arising on the spool side to the output shaft, wherein the second clutch comprises a stopper that restricts the clutch weight from deploying at the time of forward direction rotation of the output shaft by abutting the clutch weight, but which permits the clutch weight to deploy at the time of reverse direction rotation of the output shaft.

2. The webbing take-up device of claim 1, wherein the second clutch comprises:

a base that is supported so as to be rotatable about an axis thereof, a rotor that is integrally coupled to the base, that is connected to the output shaft of the motor and that rotates as a result of rotation of the output shaft being transmitted, a clutch gear that is provided so as to be capable of relative rotation with respect to the rotor, that is connected to the spool, and that rotates the spool by rotating, a clutch spring that is provided coaxially to, and capable of relative rotation with respect to, the clutch gear, and that has one winding direction end portion coupled to the rotor and another winding direction end portion, the clutch spring engaging with the clutch gear by an external diameter dimension of the clutch spring being increased by the other winding direction end portion moving towards a one winding direction, and rotating the clutch gear integrally with the rotor, and a lever that is provided so as to be capable of rotating about an axis thereof with respect to the base, that is biased in one direction about a base axis, and that is coupled to the other winding direction end portion of the clutch spring, the lever moving the other winding direction end portion of the clutch spring towards the one winding direction by rotating in another direction about the base axis;

the clutch weight that is supported so as to be capable of deploying in a radial direction with respect to the base, that is coupled to the lever, and that is retained by the lever at the radial direction inner side of the base, the clutch weight deploying towards the radial direction outer side of the base due to centrifugal force acting on the clutch weight during rotation of the base caused by the rotation of the output shaft, thereby rotating the lever in the other direction about the base axis, and the stopper, which is disposed coaxially to the base and is supported so as to be rotatable with the base axis as a rotation axis.

3. The webbing take-up device of claim 2, wherein: a projection portion projecting towards the radial direction outer side of the base is provided at the base, when the base rotates due to forward direction rotation of the output shaft, the projection portion abuts a portion of the stopper and retains the stopper at a position that restricts deployment of the clutch weight, and when the base rotates due to reverse direction rotation of the output shaft, the projection portion abuts another portion of the stopper and retains the stopper at a position that permits deployment of the clutch weight.

4. The webbing take-up device of claim 3, wherein rotation of the stopper is restricted until the projection portion abuts the one portion of the stopper or the other portion of the stopper as a result of rotation of the base.

5. The webbing take-up device of claim 3, wherein rotation of the stopper is restricted until the projection portion abuts the one portion of the stopper or the other portion of the stopper as a result of one part of the stopper being abutted or being press fit into a component member of the webbing take-up device.

6. The webbing take-up device of claim 1, wherein the second clutch comprises a base that is supported so as to be rotatable about an axis thereof, the clutch weight being supported on the base, a projection portion is provided at the base, when the base rotates due to forward direction rotation of the output shaft, the projection portion abuts a portion of the stopper and retains the stopper at a position that restricts deployment of the clutch weight, and when the base rotates due to reverse direction rotation of the output shaft, the projection portion abuts another portion of the stopper and retains the stopper at a position that permits deployment of the clutch weight.

7. The webbing take-up device of claim 6, wherein the portion and the other portion of the stopper are one end portion in an axis rotation direction and another end portion in the axis rotation direction of the stopper.

8. The webbing take-up device of claim 1, wherein:

the second clutch comprises a base that is supported so as to be rotatable about an axis thereof;

the clutch weight is supported on the base so as to be capable of deploying in a radial direction with respect to the base;

the stopper and the clutch weight are independent members to each other; and when the base rotates due to forward direction rotation of the output shaft, the base abuts a portion of the stopper and retains the stopper at a position that restricts deployment of the clutch weight, and when the base rotates due to reverse direction rotation of the output shaft, the base abuts another portion of the stopper and retains the stopper at a position that permits deployment of the clutch weight.

9. The webbing take-up device of claim 8, wherein the second clutch further comprises a lever that is provided so as to be capable of rotating about an axis thereof with respect to the base, and that is coupled to the clutch weight such that the clutch weight is capable of deploying in the radial direction.

10. The webbing take-up device of claim 9, wherein the stopper includes a general portion having a dimension substantially the same as a dimension of the clutch weight which is in a state of not being deployed, in a radial direction, and an abut portion that is capable of abutting the clutch weight.

11. The webbing take-up device of claim 1, wherein the stopper and the clutch weight are independent members to each other, and the stopper includes a general portion having a dimension substantially the same as a dimension of the clutch weight which is in a state of not being deployed, in a radial direction, and an abut portion that is capable of abutting the clutch weight.

12. The webbing take-up device of claim 1,
wherein the second clutch further comprises a lever that is provided so as to be capable of rotating about an axis thereof with respect to the base, and that is coupled to the clutch weight such that the clutch weight is capable of deploying in the radial direction wherein the stopper, and wherein the stopper, lever, and clutch weight are mechanically independent members.

\* \* \* \* \*